US010742848B2

(12) United States Patent
Weil et al.

(10) Patent No.: US 10,742,848 B2
(45) Date of Patent: Aug. 11, 2020

(54) CLOSED LOOP COLOR CALIBRATION WITH MULTIPLE INLINE IMAGERS

(71) Applicant: Hydragraphix LLC, New York, NY (US)

(72) Inventors: Allen Lorne Weil, New York, NY (US); Fred W. Finnerty, Dawsonville, GA (US); Kenneth E. Irwin, Jr., Dawsonville, GA (US)

(73) Assignee: Hydragraphix LLC, New York, NY (US)

( * ) Notice: Subject to any disclaimer, the term of this patent is extended or adjusted under 35 U.S.C. 154(b) by 0 days.

(21) Appl. No.: 15/646,742

(22) Filed: Jul. 11, 2017

(65) Prior Publication Data

US 2018/0020126 A1    Jan. 18, 2018

Related U.S. Application Data

(60) Provisional application No. 62/361,256, filed on Jul. 12, 2016.

(51) Int. Cl.
| | |
|---|---|
| *H04N 1/60* | (2006.01) |
| *A63F 3/06* | (2006.01) |
| *G06K 15/00* | (2006.01) |
| *G06K 15/02* | (2006.01) |
| *H04N 1/00* | (2006.01) |

(52) U.S. Cl.
CPC ......... *H04N 1/6041* (2013.01); *A63F 3/0655* (2013.01); *A63F 3/0665* (2013.01); *G06K 15/007* (2013.01); *G06K 15/027* (2013.01); *H04N 1/00665* (2013.01); *H04N 1/6008* (2013.01); *H04N 1/6052* (2013.01)

(58) Field of Classification Search
None
See application file for complete search history.

(56) References Cited

U.S. PATENT DOCUMENTS

| | | | |
|---|---|---|---|
| 4,299,637 | A | 11/1981 | Oberdeck et al. |
| 4,725,079 | A | 2/1988 | Koza et al. |
| 4,858,123 | A | 8/1989 | Alexoff et al. |
| 5,569,512 | A | 10/1996 | Brawner et al. |
| 5,704,647 | A | 1/1998 | Desbiens |

(Continued)

FOREIGN PATENT DOCUMENTS

| | | |
|---|---|---|
| WO | 2009062297 A1 | 5/2009 |
| WO | 2010130041 A1 | 11/2010 |

OTHER PUBLICATIONS

Int'l Search Report dated Oct. 2, 2017 in Int'l Application No. PCT/US17/41459.

(Continued)

*Primary Examiner* — Barbara D Reinier
(74) *Attorney, Agent, or Firm* — Neal, Gerber & Eisenberg LLP

(57) ABSTRACT

Production methods and systems enable the inline production of instant lottery tickets or documents using at least three different digital imagers. By interfacing at least three digital imagers in a common printing line, heretofore unknown printing efficiencies are realized, particularly on smaller volume print runs. These methods and systems enhance the overall appearance of the printed instant lottery tickets or documents, as well as potentially expand the consumer base.

10 Claims, 22 Drawing Sheets

(56) References Cited

U.S. PATENT DOCUMENTS

| | | | |
|---|---|---|---|
| 6,344,902 B1 * | 2/2002 | Duke | H04N 1/6011 |
| | | | 358/1.9 |
| 6,543,808 B1 | 4/2003 | Mitchell, Jr. et al. | |
| 6,809,855 B2 * | 10/2004 | Hubble, III | G01J 3/02 |
| | | | 250/226 |
| 8,074,570 B2 | 12/2011 | Grotkowski et al. | |
| 9,774,763 B2 * | 9/2017 | Schulmeister | H04N 1/6033 |
| 2004/0060011 A1 | 3/2004 | Nitta et al. | |
| 2005/0071104 A1 | 3/2005 | Viturro et al. | |
| 2005/0134872 A1 * | 6/2005 | Maki | B41F 33/0036 |
| | | | 358/1.6 |
| 2007/0216918 A1 * | 9/2007 | Honeck | B41F 31/045 |
| | | | 358/1.9 |
| 2007/0268502 A1 | 11/2007 | Mccarthy et al. | |
| 2008/0131176 A1 | 6/2008 | Snyder | |
| 2010/0075735 A1 | 3/2010 | Luciano, Jr. et al. | |
| 2010/0201998 A1 | 8/2010 | Quach | |
| 2010/0253063 A1 | 10/2010 | Skogster | |
| 2011/0126729 A1 | 6/2011 | Morono et al. | |
| 2012/0025516 A1 | 2/2012 | Miller et al. | |
| 2012/0145024 A1 | 6/2012 | Scrymgeour et al. | |
| 2012/0267888 A1 | 10/2012 | Behm et al. | |
| 2017/0259588 A1 * | 9/2017 | Fernandez | B41J 11/46 |

OTHER PUBLICATIONS

Int'l Preliminary Report on Patentability dated Apr. 16, 2019 in Int'l Application No. PCT/US2017/041459.
"Extended European Search Report", Application No. EP17828270.3 (8 pages), dated Feb. 12, 2020.

\* cited by examiner

CLOSED LOOP COLOR CALIBRATION WITH MULTIPLE INLINE IMAGERS

CROSS-REFERENCE TO RELATED APPLICATION

This application claims the benefit of U.S. Application No. 62/361,256, filed Jul. 12, 2016, the disclosure of which is hereby incorporated herein in its entirety.

FIELD OF THE INVENTION

The present invention is the innovation of control mechanisms for enabling the printing of instant or scratch-off tickets and other documents utilizing a series of general-purpose full color digital printers coupled via a common web to one or more fixed plate printing station(s). Specifically, this innovation resolves the problem of producing high quality instant (i.e., scratch-off) tickets and other reveal documents (e.g., pull-tab documents) with digital printers or imagers having consistent color imaging across multiple imagers and substrates, with registration and synchronization, with multiple coordinated Raster Image Processors (RIPs), and in a cost effective manner.

BACKGROUND

Lottery games have become a time honored method of raising revenue for state and federal governments the world over. Traditional scratch-off and draw games have evolved over decades, supplying increasing revenue year after year. However, after decades of growth, the sales curves associated with traditional games seem to be flattening out. This flattening of lottery sales curves is typically attributed to a fixed base of consumers that routinely purchase lottery products with very few new consumers choosing to participate in the lottery marketplace. Various analyses of state lottery sales data tend to support the hypothesis that lotteries rely heavily on an existing consumer base and more specifically on lottery "super users." Three states (Rhode Island, South Dakota and Massachusetts) had 2014 lottery sales that topped $700 per capita. While ten states had per capita sales below $100, per capita sales for all state lotteries averaged almost $250. Demographically speaking, this existing base of lottery consumers is aging with younger consumers showing very little interest in participating in existing lottery offerings. Thus, the potential for ever-increasing lottery sales is increasingly problematic with the existing fixed base of consumers saturated. Consequently, both lotteries and their service providers are presently searching for more marketable forms of gaming that would appeal to a broader consumer base.

In addition to flattening sales, a static lottery consumer base is often cited as exploiting problem gamblers with various legislatures debating restrictions or probations being placed on lotteries. For example, the "Stop Predatory Gambling Foundation", which advocates an end to state-sponsored gambling recently stated: "In Minnesota, a pending bipartisan bill would require 25% of lottery billboards to be dedicated to a warning about the odds of winning, cautions about addiction, and information on where problem gamblers can seek help."

In an attempt to diversify their base and increase sales, United States lotteries have come to appreciate the virtues of producing games with more entertainment value that can be sold at a premium price. For instance, ten-dollar instant ticket games with higher paybacks and more ways to win now account for over $5 billion a year in United States lottery sales. However, these premium games are typically displayed in standard instant ticket dispensers behind the glass of the retailer counter next to the lower priced more mundane instant ticket offerings with very little visual differentiation between the standard and premium instant tickets. Thus, while these higher-priced and higher-payout premium games offer a different gaming experience that may appeal to a different player demographic, there is little to differentiate these enhanced games from the standard offering, especially for a casual consumer. To date, attempts have been made to differentiate premium games a with larger ticket sizes (e.g., six by four inches) and in some cases holographic foil substrates, as well as fluorescent and metallic inks. However, these methods come at a high production cost with arguably very little product differentiation for a new or casual consumer.

But by their nature, high-volume, generic, higher priced instant games are a minor part of overall game offerings and although they have their place, they have limited potential for assisting in consumer base diversification. The higher-priced and high-volume nature of these games tends to drive the lotteries to generic (i.e., proven) type of play (i.e., appealing to existing player base) with very little experimentation possible. Lastly, these higher priced and high-volume games also typically add little unique entertainment value relative to lower priced instant tickets and consequently, do not attract many new consumers.

This phenomenon of a relatively small percentage of the population responsible for a large majority of lottery sales is partially due to the commoditization of lottery tickets by ticket manufacturers. In the past decade, manufacturers of instant lottery tickets have developed techniques which enabled fixed plate produced color images to be printed as display and on top of (i.e., overprinted on) the scratch-off layers. Using this conventional printing method, the display and overprint images are stationary and do not change from one printing impression to the next during a single printing run—e.g., the overprint cards and methods disclosed in U.S. Pat. No. 5,569,512 and the overprint lottery tickets and methods disclosed in U.S. Pat. No. 5,704,647. This, in turn, confines the instant lottery ticket product to high-volume print runs with very little experimentation in terms of theming and gaming experience due to the need to ensure that the vast majority of print runs sells out to be economically feasible. Therefore, these high-volume print runs tend to be themed around well-established concepts that have been developed over years principally designed to exploit "super users."

Lottery ticket production involves variable information or indicia when designing the play styles and prize payout functions of the games. It is impractical to meet these requirements using conventional plate printing techniques such as flexographic printing to produce game play and validation information in the security areas hidden by the Scratch-Off Coating (SOC) of tickets. Far too many plate changes would be required to produce the vast amount of variable indicia in the security areas to complete a run of large volumes of tickets, rendering plate printing for this purpose not viable. Thus, to date almost all lottery ticket variability has been confined to monochromatic variable indicia or two-spot color variable indicia imaged by drop-on-demand ink jet printers with the display and overprints being mostly static from game to game.

While there has been some industry effort to advance instant lottery ticket printing technology with full color digital imaging (most notably: US patent application publication Nos. US 2010/0253063 and US 2012/0267888), most of this effort has focused primarily on providing color digital imaging exclusively on variable win or lose indicia. In these embodiments ticket display, overprint, and backs are printed with traditional fixed plate methods. Thus, make ready (i.e., press set-up) time and expense are not reduced and arguably increased for tickets disclosed in all of these cited patent applications. Furthermore, the economics of press run lengths (i.e., long press runs required to offset the preparation costs—a.k.a. "make ready") is not changed and require high-volume print runs with these embodiments, thereby once again restricting experimentation in terms of theming and gaming experience.

U.S. Pat. No. 8,074,570 discloses: " . . . multi-colour, (sic.) variable imaging of the graphics . . . applied to both the game area and non-game areas of the (lottery instant) ticket." (Column 2, lines 22-23) " . . . The variable image printing system used for the application of the game data is a different system from the variable image printing system used for the graphic areas over the play and non-play areas of the ticket. These are distinct systems although the technology is similar." (Column 2, lines 26-30). In a second embodiment as taught by the '570 patent, the different system for printing or partially printing the graphic areas over the play and non-play areas of the ticket is at a different location (column 2, line 65). Thus, while the '570 patent teaches potential elimination of fixed plate display and overprint printing for lottery tickets with a corresponding reduction in make ready time and expense, it only achieves this reduction by introducing a second imaging system that is not inline with the first and may be located in a different geographical area entirely. Therefore, any costs savings in make ready will be more than consumed with the additional labor and logistics associated with printing tickets on two different imaging systems. As a consequence, the economics of press run lengths is again not changed and the resulting high-volume print runs once again restrict experimentation in terms of theming and gaming experience.

Patent Cooperation Treaty (PCT) International patent application publications WO 2009/062297 and WO 2010/130041 attempt to address this problem by teaching that a general-purpose off-the-shelf color digital imager (e.g., Hewlett-Packard HPT300 color ink jet web press) can be utilized to create full color indicia for instant tickets. However, the '297 and '041 publications envision the off-the-shelf color digital imager as a stand-alone unit with the web substrate being pre- or post-processed by separate printing stations (e.g., flexographic) to print the required security and scratch-off ink films. Additionally, in the embodiments of the '297 and '041 publications, the same web substrate is rolled and unrolled multiple times first to apply the lower security ink film layers, then to apply the digital imaged variable indicia, and finally to apply the scratch-off coatings and upper ink film security layers. This repeated rolling and unrolling of the web substrate has the disadvantages of substantially increasing production costs due to labor as well as substantially increasing the waste rates of the system. While not explicitly stated in the '297 and '041 publications, detached (i.e., not inline) implementation of an off-the-shelf color digital imager is probably the only practical method of implementation due to the nature of the web motion through these types of offset digital printing devices. In order to achieve multiple colors printing, these digital printers physically halt the web momentarily while their offset roller acquires multiple colors. Only when the offset roller is inked with all of the desired colors and ink applications is the ink applied directly to the web with the web moving forward one offset roller rotation. While aggregate digital imager speeds of 100 FPM (Feet Per Minute) are often quoted, the quoted speeds are actually average velocities with the web physically stopping and starting multiple times, thus again the labor and logistics costs of processing instant tickets on multiple press lines becomes prohibitive. Therefore, as a practical matter, if multiple digital imagers are integrated inline the maximum web speed is the processing speed of the slowest imager assuming all inline imagers ink their respective offset rollers in perfect synchronization. Thus, again production is limited to higher-volume print runs restricting experimentation in terms of theming and gaming experience.

In addition to instant scratch-off tickets, pull-tab game pieces (i.e., a tear open game of chance where the player typically opens the perforated windows on the back of the pull-tab game piece by pulling off the pull-tab and matches the symbols inside the opened windows to the winning combinations on the front of the pull-tab game piece for a potential monetary or other prize) have traditionally been printed with fixed plate printing processes using at least two different substrates—i.e., one substrate for the front and back pull-tab game piece variable win or lose variable indicia and the other substrate for the perforated window covering the back variable indicia. The printing process has traditionally been to use fixed plate offset or flexographic presses with the printed substrates containing the variable indicia, covered by the second substrate and then the completed pull tabs are physically shuffled, such that the winning pull-tab game pieces could no longer be identified by their position in the stack. While barcodes have been added to pull-tab game pieces, the traditional (i.e., fixed plate) printing process and associated shuffle are still predominating in the industry. This printing process is expensive and labor intensive and greatly limits experimentation in terms of theming and gaming experience.

An attempt to mitigate this highly manual pull-tab production process, U.S. Pat. No. 6,543,808 disclosed pull-tab game pieces produced with direct thermal imaging and a precut opaque covering. However, this construction has the disadvantage of higher overall costs due to the complexity of the substrates and associated custom machinery at the point of sale, as well as the loss of esthetics and consequently marketing by monochromatic imaging.

Thus, it is highly desirable to develop instant ticket and/or multiple substrate printing platforms that provide methods of generating new gaming opportunities, particularly more customized and consequently smaller volume games. Ideally this printing platform should provide full color imaging for variable indicia, display, and overprints, as well as to accommodate smaller print runs, thereby allowing for flexibility and creativity for game designers to tailor games to a wide variety of small targeted segments heretofore not served by existing gaming offerings, thereby appealing to a broader base of consumers.

SUMMARY OF THE INVENTION

Objects and advantages of the invention will be set forth in part in the following description, or may be apparent from this description, or may be learned through practice of the invention.

In accordance with aspects of the invention, a security-enhanced document with a removable Scratch-Off Coating (SOC) is produced, which may be an instant lottery ticket in certain embodiments. The document includes any variable imaged indicium that determines if the document wins any prize(s) or contains data that is otherwise secure under the SOC. Thus, as used herein, "ticket" or "instant lottery ticket" includes both lottery tickets and other types of security enhanced documents using scratch-off coatings. Additionally, the invention also includes production of multiple substrate documents (e.g., pull-tab game tickets) are also disclosed where the multiple substrate documents are produced on the same in-line printing press such that previously unprecedented economies of production and increased variability are realized.

In a first embodiment, at least three in-line imagers produce security-enhanced documents with variable indicia using all or some of the standard CMYK (i.e., Cyan, Magenta, Yellow, and blacK) process colors. In a preferred embodiment, the produced security-enhanced documents with variable indicia using all or some of the standard CMYK process colors include a SOC covering the variable indicia. In this embodiment, in-line production is achieved via the multiple in-line imager applications of the back, front, variable indicia, and overprint ink films on a removable SOC type document.

In another embodiment, at least three in-line imagers produce multiple substrate documents in-line. In this embodiment, multiple webs are fed into the same inline press, thereby enabling greater automation and economies of production.

In both of these embodiments, the practical problem of production of secure documents utilizing multiple (i.e., at least three) in-line digital imagers with multiple surface imaging, is achieved by real time synchronization of the multiple digital imagers. Additionally, the massive amounts of processing bandwidth required to reproduce process color images, in large volumes, at high speed with multiple in-line digital imagers is readily accommodated by imager task division and coordination among multiple Raster Image Processors (RIPs). Finally, the problem of maintaining consistent image color coordination and quality across multiple in-line imagers while possibly printing on different surfaces or ink films is addressed via coordinated network color and printing tuning. The essential concept of this invention is to coordinate real time printing of at least three digital imagers in-line on a common printing press. In the context of this invention the term "in-line" means one common printing line with a common web of paper loaded at one end and collected at the other end.

Described are a number of printing mechanisms and methods that provide practical details for reliably producing variable indicia, SOC secured, and/or multiple substrate documents with at least three in-line imagers. Although the examples provided herein are primarily related to instant tickets and pull-tab game pieces or other reveal documents, it is clear that the same methods are applicable to any type of document (e.g., telephone card, prepaid cards, vouchers, bank security instruments, coupons, etc.) where information is protected by a SOC or printed with multiple substrates—e.g., customized letters (one substrate) printed in-line with preaddressed envelopes (second substrate).

The following aspects are included as embodiments of the present invention.

Aspect 1. A method for producing Scratch-Off Coating (SOC) protected tickets or documents on a common inline web press using (i) multiple digital imagers each maintaining registration with the other, (ii) a closed loop feedback camera system, and (iii) an operator monitor display, the method comprising:

(a) printing, with each digital imager, process color physical images comprised of varying amounts of Cyan, Magenta, Yellow, and Black (CMYK) ink or dye;

(b) capturing color digital facsimiles having CMYK data of at least a portion of the printed process color physical images with a closed loop feedback camera system;

(c) processing the color digital facsimiles;

(d) comparing the color digital facsimiles with initially established color calibration data and the process color physical images of at least one of the other digital imagers;

(e) digitally adjusting the CMYK data of the color digital facsimile images to theoretically calibrate the printed tickets and documents to substantially match the initially established color calibration data;

(f) displaying the digitally adjusted color digital facsimile images on a monitor display, thereby enabling human operator approval of the digitally adjusted color digital images; and (g) saving the digitally adjusted color digital facsimile images to a memory storage associated with the inline web press so that subsequently-printed tickets or documents substantially match the initially established color calibration data.

Aspect 2. The method of aspect 1, further comprising:

(h) displaying the initially established color calibration data on the same operator monitor display as the digitally adjusted digital facsimile images of the tickets and documents.

Aspect 3. The method of claim 1, wherein the operator monitor display used for human operator approval is physically located in a different geographical location than the inline web press producing the process color physical images.

Aspect 4. The method of aspect 1, wherein the closed loop feedback camera system includes at least one portable handheld device.

Aspect 5. The method of aspect 1, further comprising:

(h) defining multiple offset calibration bias areas on portions of the printed tickets and documents wherein each calibration bias area includes its own color calibration data.

Aspect 6. The method of aspect 1, wherein the tickets or documents are pull-tab tickets or game pieces.

DETAILED DESCRIPTION

Figure 1:
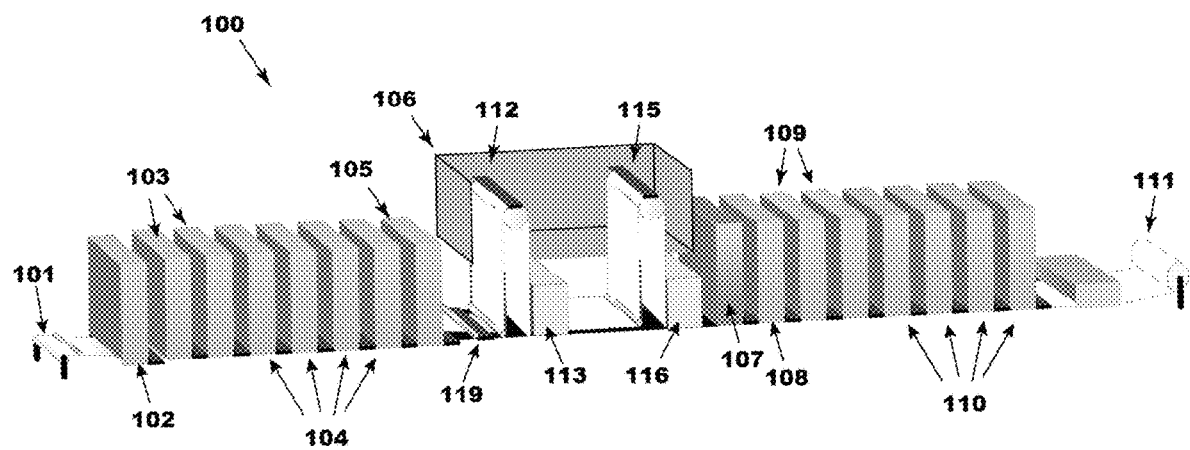
FIG. 1 is an exemplary schematic view of a typical, prior art, instant lottery fixed plate printing press line capable of producing traditional instant lottery tickets with one or two in-line imagers.

Reference will now be made in detail to examples of the various embodiments of the invention, one or more embodiments of which are illustrated in the drawings. Each example is provided by way of explanation of the invention, and not meant as a limitation of the invention. For example, features illustrated or described as part of one embodiment, may be used with another embodiment to yield still a further embodiment. It is intended that the present invention encompasses these and other modifications and variations as come within the scope and spirit of the invention.

Certain terminology is used herein for convenience only and is not to be taken as a limitation on the present invention. The words "a" and "an", as used in the claims and in the corresponding portions of the specification, mean "at least one." The terms "pull-tab tickets" or more simply "pull-tabs" as used herein are synonymous and interchangeable with "pull-tabs" used for the sake of convenience. Also, a scratch-off game piece or other scratch-off document, hereinafter is referred to generally as an "instant ticket" or simply "ticket." Additionally, the terms "full-color", "four-color", and "process color" are also used interchangeably throughout the specification as terms of convenience for producing a variety of colors by discrete combinations of applications of pigmented primary inks or dyes "CMYK"—i.e., Cyan, Magenta, Yellow, and blacK. The term "press side" and its opposite "gear side" refer to different sides of a printing press, with "press side" being the side of the press reserved for easier human operator access and "gear side" being the opposite side of the press generally reserved for press equipment (e.g., electric motors) thereby making it less accessible to the human operator(s). The term "web" refers to a continuous substrate threaded through an inline printing press that receives printing inks and/or dyes thereby forming printed documents. Finally, the term "physical image" as used herein refers to the image printed on the web by a digital imager (e.g., ink jet, bubble jet).

Figure 5:
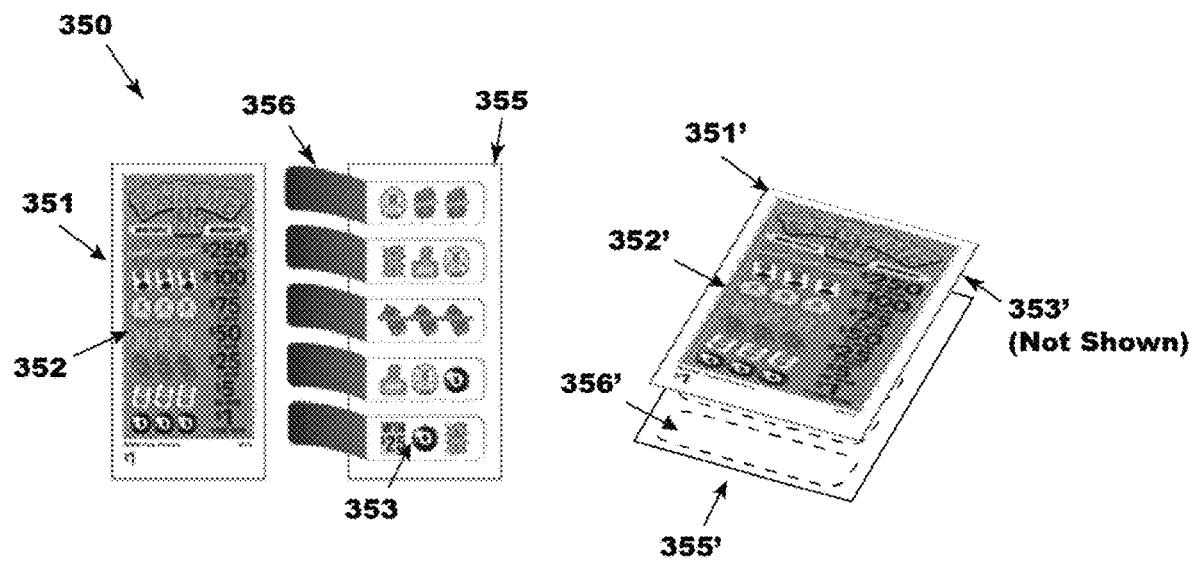
FIG. 5 is a combination plan and exploded isometric view of a representative example of a traditional, prior art, pull-tab ticket.

Before describing the present invention, it may be useful to first provide a brief description of the current state of the art of instant ticket and pull-tab ticket production, to help understand the distinctions between the prior art and the present invention. The concept is to ensure that a common lexicon is established with respect to existing systems prior to disclosing the present invention. This description of the current state of the art of instant ticket production is provided in the discussions of FIG. 1 and FIG. 2 for instant tickets, as well as FIG. 5 for pull-tab tickets. FIGS. 2 and 5 will also be used to describe the method of making a scratch-off ticket and a pull-tab ticket, respectively, with the present invention. Thus, any reference to the portions of components of the prior art scratch-off tickets of FIG. 2 or of the prior art pull-tab tickets of FIG. 5 described with respect to the methods of the present invention using equipment illustrated in and described concerning any of the drawings other than FIGS. 2 and 5, does not mean that the other drawings constitute prior art. Finally, a similar type of discussion of prior art for color matching is provided in the discussions of FIG. 17 and FIG. 18.

Figure 2:
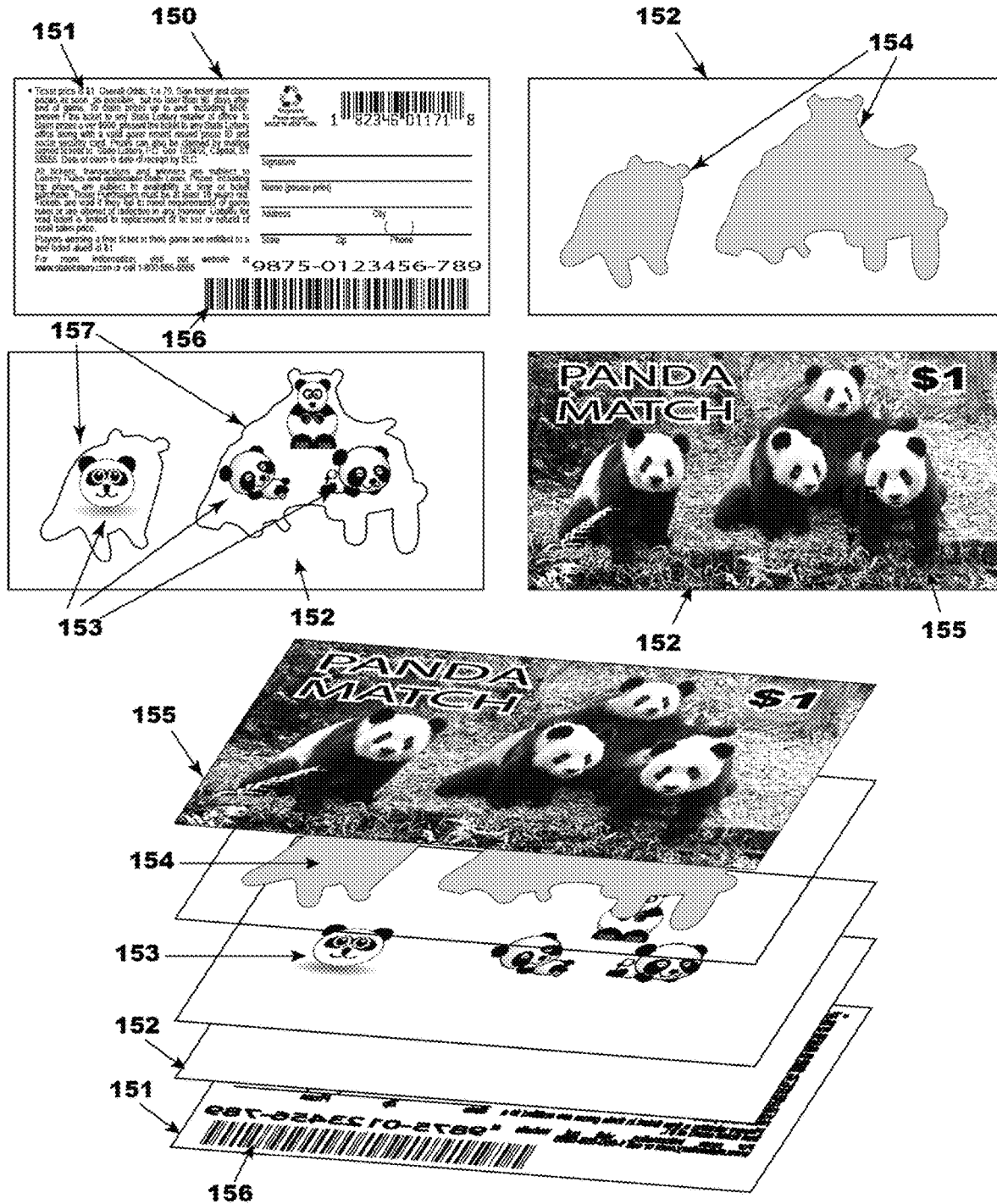
FIG. 2 is a combination plan and exploded isometric view of a representative example of a traditional, prior art, lottery-type instant ticket back, variable indicia, SOC, front display, and overprint.

FIG. 1 depicts an exemplary prior art front isometric view of a typical hybrid printing press line 100 with both fixed plate and (one or two) imager printing presses as currently utilized for printing scratch-off instant tickets. This hybrid press is typically comprised of fixed plate flexographic stations 102 through 105 and 107 through 110 in line with drop on demand inkjet imager(s) 112 and 115. Alternatively, the hybrid press may also include offset plate printing for the process color stations 104 and 110 combined with flexographic stations for the security ink applications—offset press stations typically not being suitable for security ink applications due to the relatively thin ink film layer printed by the plate offset process.

In FIG. 1, paper is supplied to the printing line 100 via web feed 101 being pulled into a first fixed plate printing unit 102 that typically prints a lower opacity layer ink film confined to what will be the scratch-off area. This lower opacity layer ink film is typically confined only to the scratch-off area, since it is normally primarily composed of carbon with subsequent ink films applied on top of the carbon black opacity ink film. Consequently, the scratch-off area of prior art tickets appears dark or gray due to the darkness of the underlying opacity layer. In addition to lower security, this first layer typically prints timing or queue marks used by all subsequent press stations and imagers in the press line to maintain registration. After the lower opacity layer application, one or two impressions of a white or light color overprint are applied at stations 103 to create a higher contrast background for the monochromatic or spot color digitally imaged variable indicia. After the contrasting ink film(s) layer(s) are applied at stations 103, CMYK inks typically are applied at stations 104 for the ticket display areas, as well as optional Benday patterns (i.e., wavy variable security patterns designed to make cutting and pasting of variable indicia from one ticket to another difficult). Next, the web is flipped (not shown in FIG. 1) and the ticket back display is printed by press unit 105 typically with a monochromatic fixed plate. The web is normally flipped again at station 119 and routed at this point to a front, typically, monochromatic imager 112 to print the variable indicia on the ticket and is then routed through a drier 113 specifically designed for the imager. Optionally, a second imager 115 is employed to image any non-secure (i.e., not covered by a SOC) variable indicia (e.g., a barcode or a human readable inventory control number) on the ticket back, where this non-secure variable indicia is also typically monochromatic. As with the front imager, the optional back imager similarly includes its own drier 116. Both the front and back imagers are typically housed in a separate secure area 106, to help safeguard the secure variable indicia (i.e., win or lose data normally hidden under the SOC).

After the indicia are imaged, a release ink film is normally printed by a fixed plate printer 107 over the scratch-off area. The release ink film forms a clear hard surface that protects the variable indicia from damage caused by scratching as well as enables any subsequent ink film(s) to scratch-off. Next, an upper opacity ink film is applied via a fixed plate printer at station 108 over the scratch-off layer to provide additional protection against candling, as well as fluorescence of the secure variable indicia. Like the lower security ink films, one or two impressions of a white or light color SOC overprint are applied at fixed plate stations 109 to create a higher contrast background for the overprints. Finally, four-color CMYK or spot color plates at stations 110 apply the overprint to the scratch-off area with the resulting web of lottery tickets accumulated in a take-up reel 111.

This classic instant lottery ticket printing press line 100 has been developed over decades and is designed for efficiencies of costs for very large print runs (e.g., 10 million to 500 million tickets) where the high start-up and press costs can be amortized over a large number of tickets. Consequently, these classic instant lottery ticket press lines 100 are large in size and costs and tend to be collocated in a few large secure facilities with game programming servers. Another effect of the classic press line 100 is that the high volume print runs necessary to amortize costs limit creativity and customization of lottery ticket game design, as well as require significant lag time for the production and distribution of tickets from the collocated production facilities to the lottery jurisdictions. When it is realized that large print runs of tickets inherently have significant weight (e.g., 100 million 2×4 inch 10-point tickets would weigh approximately 142 tons or around 129,000 kg), it can be readily appreciated that express shipping of such hefty loads would carry a prohibitively high cost, thereby compounding the lag time problem.

FIG. 2 depicts an exemplary combination plan and isometric view of a representative example of a traditional scratch-off lottery-type instant ticket having a substrate back 150 and front 152. Variable indicia 153 is typically imaged on the front 152 in a predefined scratch-off area 157 with a SOC 154, and front display and overprint 155 covering.

As shown in FIG. 2 the substrate back 150 is typically printed with fixed plate printing 151 containing legal information, an identity block, and variable indicia 156 that is both human readable and machine readable providing inventory control information. The front 152 of the substrate is typically printed with a lower security layer 157, variable indicia 153 that determines the ticket's human readable win or lose status, security overprints and a SOC 154, as well as fixed plates display and SOC overprint 155. Thus, a typical instant ticket is the composite of various layers of ink film both digitally imaged and printed with fixed plates.

Figure 3:
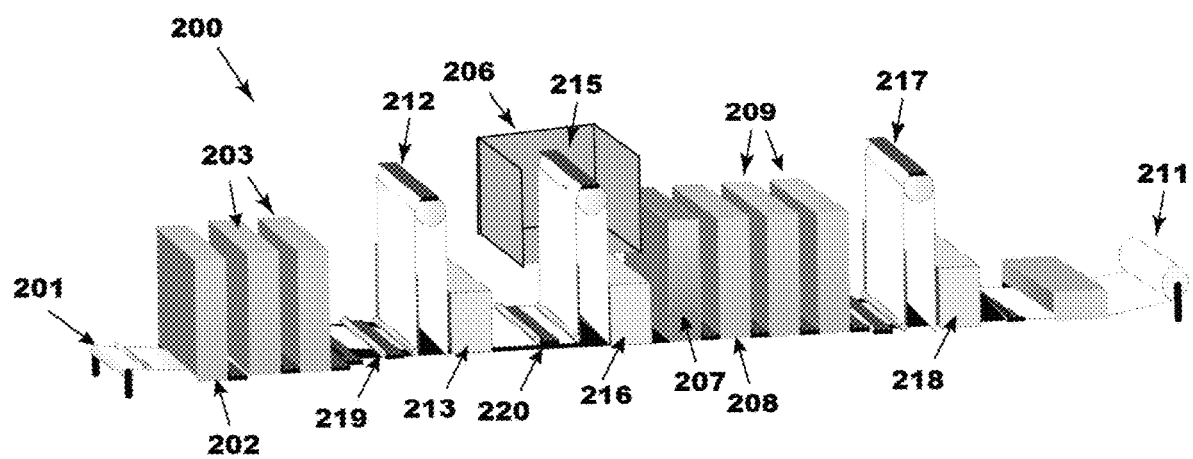
FIG. 3 is a schematic view of one exemplary embodiment of an instant ticket printing line according to the present invention with at least three digital imagers capable of producing both traditional (high volume) and targeted small-run instant lottery tickets.

A basic embodiment of the present invention is illustrated in FIG. 3. The figure provides an exemplary front isometric view of a hybrid fixed plate printing press 200 with three inline digital imagers 212, 215, and 217 capable of printing instant lottery instant tickets in smaller volumes with reduced make ready (i.e., press setup) times and expense than the traditional prior art press of FIG. 1.

As illustrated in FIG. 3, the hybrid press 200 eliminates the need for fixed plate printing of the ticket back, display, and overprint (e.g., fixed plate stations 104, 105, and 110 as shown in FIG. 1) by utilizing the first inline digital imager 212 (FIG. 3) to print the ticket's back including both static text (e.g., legal notice 151 of FIG. 2) and variable non-secure indicia (e.g., inventory barcode 156). The second inline digital imager 215 (FIG. 3) prints the ticket's secure variable indicia (e.g., 153 of FIG. 2), as well as the non-secure ticket display (i.e., front portion of the ticket that is not in the scratch-off area). The third inline digital imager 217 (FIG. 3) prints the ticket's overprint (i.e., the scratch-off decorative covering). In a preferred embodiment, all three inline digital imagers 212, 215 and 217 are capable of producing full process colors (i.e., CMYK), such that the appearance of the ticket's display and overprint are not compromised and in many cases are greatly enhanced by the added resolution of the digital imagers. Since the second inline digital imager 215 prints the secure variable indicia (i.e., the ticket's human readable win or lose data that is hidden under the SOC until the ticket is purchased and played), it is the only inline imager that ideally should be maintained in a separate secure area 206, but still inline. This can be accomplished by feeding the common web also fed into the other digital imagers 212 and 217 into the digital imager 206 that is maintained within a physically secure area, shown schematically in FIG. 3 by the walls around digital imager 206, thereby ensuring that unauthorized personnel do not gain access.

This hybrid press 200 with three inline digital imagers (212, 215, and 217) receives paper, as before with the prior art, supplied to the printing line via a web feed 201 being pulled into a first fixed plate printing unit 202 that prints a lower opacity layer ink film confined to what will be the scratch-off area (e.g., 154 of FIG. 2). This lower opacity layer ink film is typically confined to only the scratch-off area. After the lower opacity layer application, one or two impressions of a white or light color overprint are applied at fixed plate printers at stations 203 (FIG. 3) to create a higher contrast background for the monochromatic or spot color digitally imaged indicia. After the contrasting layer(s) ink film(s) are applied, the web is flipped at station 219 with black and/or CMY ink or dye digitally imaged on the ticket's back 150 by the first inline digital imager 212 to print static text and/or graphics 151 as well as any variable non-secure indicia 156 such as inventory control numbers and/or barcodes. A special drier 213 is typically included after the first inline digital imager 212 to ensure drying of the imaged ticket back at a high speed. This special drier can include a longer convection oven and optionally, InfraRed (IR) heating lamps for water based ink or dye jet imagers. In some applications, direct energy cured ink (e.g., ultraviolet or "UV") may be utilized instead of water based inks or dyes. With these types of applications, a direct energy curer (e.g., UV tunnel) would be employed instead of a convection oven or tunnel and/or IR.

After the back of the ticket is imaged, the web is flipped again at station 220 and then the second secure digital imager 215 prints the variable indicia 153 and, optionally, the ticket display and overprint 155. Ideally, the second secure digital imager 215 is a four-color (i.e., CMYK) imager producing full color images for both the display and secure variable indicia. If optional Benday patterns are desired, the secure digital imager 215 would print the Benday patterns when it is printing the secure variable indicia. In an alternative embodiment, the second secure digital imager 215 only prints the secure variable indicia with the third overprint digital imager 217 printing both the display and overprint 155. Regardless of which embodiment is concerned, the second secure digital imager 215 will typically include a special drier 216 to ensure drying of the imaged ticket back at speed with a longer convection oven and optionally, IR heating lamps or in some cases direct energy curing such as UV.

Once the back of the ticket and the variable indicia and optionally, the display, are imaged, a release ink film is normally printed by a fixed plate printer 207 over the scratch-off area. The release ink film forms a hard surface that protects the variable indicia from damage caused by scratching, as well as enables any subsequent ink film to scratch-off. Since the integrity and ink film thickness of the release coat is paramount to protect the variable indicia for both security and player scratching, the release coat is typically direct energy cured (e.g., UV or electron beam), thereby allowing a higher pigment loading with a resulting thicker ink film printed. Next, an upper opacity ink film is applied at a fixed plate printer at station 208 over the scratch-off layer to provide additional protection against candling, as well as fluorescence of indicia. Similar to the lower security ink films, one or more impressions of a white or light color SOC overprint are applied at fixed plate printers at stations 209 to create a higher contrast background for the overprints.

Finally, the third digital imager 217 prints the overprint 155, and optionally, the display (assuming the display was not previously printed by second digital imager 215), preferably in full-color (i.e., CMYK) inks, thereby covering the scratch-off area in a decorative design and optionally providing the ticket display. As before, the third secure digital imager 217 typically includes a special drier 218 to ensure drying with a longer convection oven and optionally, IR heating lamps or in some cases direct energy curing such as UV. The resulting web of lottery tickets is accumulated in a take-up reel 211.

This hybrid instant lottery ticket printing press line 200 with at least three digital inline imagers has many advantages over the traditional (prior art) press configuration. First, the make ready (i.e., press setup) time and cost are greatly reduced due to the elimination of the fixed plate process color stations for the display and overprint, as well as at least one fixed plate station for the ticket back. Second, the inclusion of digital imagers for the back, display, variable indicia, and overprint enable completely variable tickets (i.e., tickets that may have an appearance change from ticket-to-ticket) thereby allowing for creation of collector series tickets, match games, higher security, etc. Third, the overall appearance of the ticket is greatly enhanced with full color variable indicia and near photo quality capable back, display, and overprint layers. Fourth, ancillary documents (e.g., pack activation slips, advertising) may be printed inline with tickets, thereby reducing additional packing labor as well as aiding logistics. Fifth, the overall security of the instant ticket can be improved with higher immunity to pinpricking attacks (where a small portion of the SOC is removed via small holes in an attempt to identify the variable indicia without having the ticket appear played) due to greater variable and complexity of variable indicia design, which would typically highlight such pinpricking attempts.

Figure 4:
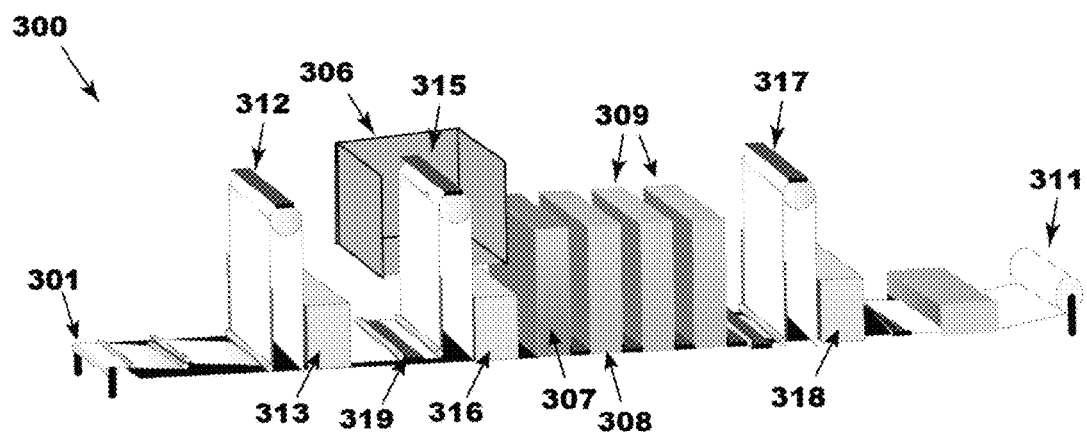
FIG. 4 is a schematic view of a second alternative exemplary embodiment of an instant ticket printing line according to the present invention with at least three digital imagers capable of producing both traditional (high volume) and targeted small-run instant lottery tickets utilizing secure paper stock.

The efficiencies of the hybrid instant lottery ticket printing press line 200 of FIG. 3 can be further enhanced by utilizing preprocessed paper stock that includes lower opacity security as well as white coverings over the entire substrate—see FIG. 4. As illustrated in FIG. 4, a hybrid press 300 is similar to the hybrid printing press line 200 of FIG. 3 except for the elimination of the lower security fixed plate printing stations 202 and 203 of FIG. 3. By transferring the lower security to the paper manufacturing and finishing process, the press 300 of FIG. 4 make ready times and costs are further reduced with greater printing flexibility due to the lower security no longer being confined to a designated area on the inline press. Typically, the slightly added costs of inks and materials required to cover the entire substrate surface in the paper manufacturing process are more than compensated for by the savings in make ready for the press. In this embodiment, the white primer covering the lower opacity layer must be sufficiently opaque and dense that it does not appear to be gray or tinted, thereby detracting from the ticket's enhanced appearance.

As with the hybrid printing press line 200, the hybrid instant lottery ticket printing press line 300 of FIG. 4 utilizes its first inline digital imager 312 to print the ticket's back including both static text and variable non-secure indicia, the second inline digital imager 315 to print the ticket's secure variable indicia and (optionally) the non-secure ticket display, with the third inline digital imager 317 printing the ticket's overprint and, optionally, the display. As with the second inline digital imager 215, since the second inline digital imager 315 prints the secure variable indicia, it is the only inline imager that ideally should be maintained in a separate secure area 306.

This hybrid press 300 with three inline digital imagers receives paper supplied to the printing line via a web feed 301 being pulled into the first imager 312 where black and/or CMY inks are digitally imaged on the ticket's back to print static text and/or graphics as well as any variable non-secure indicia such as inventory control numbers or barcodes. A special drier 313 is typically included after inline digital imager 312 to ensure drying of the imaged ticket back at speed. This special drier can include a longer convection oven and optionally, IR heating lamps or in some cases direct energy curing such as UV.

After the back of the ticket is imaged, the web is flipped at station 319 with the digital imager 315 printing the secure variable indicia and, optionally, the ticket display. In an alternative embodiment, the secure second digital imager 315 only prints the secure variable indicia with the overprint third digital imager 317 printing both the display and overprint. Regardless of which embodiment may be in place, the secure second digital imager 315 will typically include a special drier 316 to ensure drying similar to the drier 313.

Once the back of the ticket and indicia and optional display are printed, a release ink film is normally printed by a fixed plate printer 307, thereby defining the scratch-off area. Next, an upper opacity ink film is applied at station 308 over the release ink film scratch-off layer to provide additional protection against candling, as well as fluorescence of the variable indicia. Like the lower security ink films, one or more impressions of a white or light color SOC overprint are applied at fixed plate printer stations 309 to create a higher contrast background for the overprints.

Finally, the third digital imager 317 prints the overprint, and optionally, the display (if not printed by the imager 315) in preferably full-color inks, thereby covering the scratch-off area in a decorative design and optionally providing the ticket display. As before, the third secure digital imager 317 typically includes a special drier 318 to ensure drying. The resulting web of lottery tickets is accumulated in a take-up reel 311.

In addition to lottery instant tickets, the general concept of using at least three inline digital imagers in a common press line can also greatly enhance the efficiencies and flexibility of pull-tab ticket, game piece, or other pull-tab document production. For clarity, a representative example of a traditional pull-tab ticket 350 is illustrated in FIG. 5. A pull-tab ticket 350 generally comprises two separate substrates adhered together to form a homogenous gaming piece. As shown in FIG. 5, the top substrate 351 and 351' is printed on one side with display graphics 352 and 352', with the other side printed with variable indicia 353 and 353'. Attached to the side with the variable indicia 353 and 353' of the top substrate 351 and 351' is a second substrate 355 and 355' with at least partially peripheral perforated pull-tabs 356 and 356' that can be destructively peeled back by the consumer to reveal the variable indicia 353 and 353' win or lose status. Thus, the pull-tab tickets 350 operate in a similar manner to lottery instant tickets with variable indicia revealed by the consumer after purchase. However, the variable indicia on pull-tab tickets are typically printed on a sheet fed fixed plate press where the two substrates are adhered together, the tickets are individually cut, and then manually shuffled. Thus, traditional pull-tab ticket production is limited in variability (i.e., number of different tickets per sheet), with reduced security, and is labor intensive, and consequently error prone and inefficient.

Figure 6:
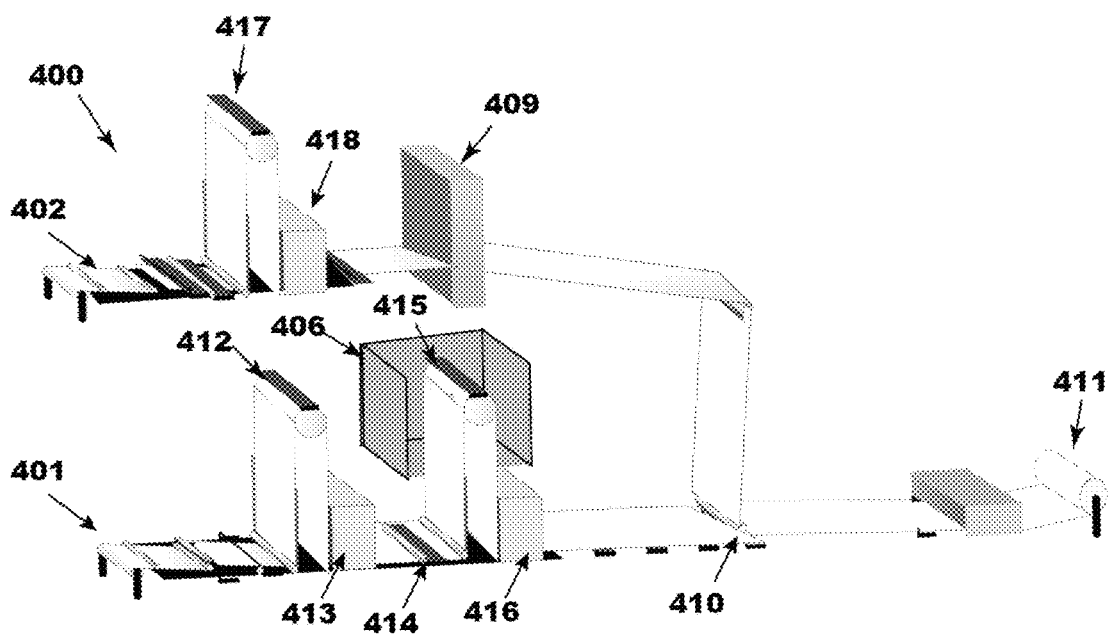
FIG. 6 is a schematic view of an exemplary embodiment of a pull-tab ticket printing line with at least three digital imagers according to the present invention.

FIG. 6 illustrates a press configuration 400 using the same concept of at least three inline digital imagers in a common inline press configuration as described above (i.e., FIGS. 3 and 4), but rather than producing instant tickets, is designed to process at least two different substrates at using presses 401 and 402 printing on both substrates and combining the two into one product, such as a pull-tab ticket in web form rolled onto a take-up reel 411. With this press configuration 400, the production of pull-tab tickets and other dual substrate documents can be greatly enhanced in terms of efficiency, security, and variability.

The hybrid dual substrate pull-tab ticket printing press 400 of FIG. 6 uses its first inline digital imager 412 to print the ticket's front display (352 and 352' of FIG. 5), including optional variable non-secure indicia such as an inventory control number or barcode. The second inline digital imager 415 (FIG. 6) prints the pull-tab ticket's secure variable indicia e.g., 353 and 353' of FIG. 5. Since the second inline digital imager 415 (FIG. 6) prints the secure variable indicia, it is the only inline imager that ideally should be maintained in a separate secure area 406.

The upper substrate is supplied to the printing line via a web feed 401 and is pulled into the first digital imager 412 where full color (CMYK) inks or dyes are digitally imaged on the ticket's front (e.g., 352 and 352' of FIG. 5) to print static text and/or graphics, as well as any variable non-secure indicia such as inventory control numbers or barcodes. A special drier 413 (FIG. 6) is typically included after first inline digital imager 412 to ensure drying of the imaged ticket back at speed. This special drier can include a longer convection oven and optionally, IR heating lamps, or in some cases direct energy curing such as UV.

After the front of the pull-tab substrate is imaged, the web is flipped at station 414 with the second secure digital imager 415 printing the secure variable indicia (e.g., 353 and 353' of FIG. 5). As with the first digital imager 412 (FIG. 6), the secure second digital imager 415 will typically include a special drier 416 to ensure drying similar to the drier 413.

Once the pull-tab upper substrate 351 and 351' (FIG. 5) display 352 and 352' and secure variable indicia 353 and 353' are printed, the lower pull-tab substrate 355 and 355' is imaged and applied as a security layer over the secure variable indicia 353 and 353'. In this embodiment, the lower substrate 355 and 355' is supplied to the printing line via separate web feed 402 (FIG. 6) being pulled into the third imager 417 where full color images are digitally imaged on the pull-tab ticket's secure covering (e.g., 355 and 355' of FIG. 5) thereby printing static text and/or graphics, as well as any variable non-secure indicia such as inventory control numbers or barcodes. A special drier 418 (FIG. 6) is typically included after inline digital imager 417 to ensure drying of the imaged ticket back.

Finally, perforations and adhesive are applied by a perforator 409 to the second substrate (e.g., 355 and 355' of FIG. 5) with the second substrate pressed into the first substrate (351 and 351') with a pressure roller 410 (FIG. 6) forming homogeneous pull-tab game pieces. The resulting web of pull-tab tickets is accumulated in a take-up reel 411.

Thus, hybrid press lines with at least three inline digital imagers have the potential to decrease run sizes, increase security, greatly reduce make ready time and expense, and enhance appearance for scratch-off lottery instant tickets, pull-tab tickets, and other documents. The problem then becomes the practical ramifications of interfacing three or more digital imagers inline while maintaining registration with synchronous and non-synchronous operation of all components of the printing press line.

The prior art traditional press line with at most two inline digital imagers 100 of FIG. 1 typically has minimal registration requirements between its imagers 112 and 115, since the imaging is on different sides of the substrate; however, if variable inventory control indicia are printed on the ticket, it is essential that the ticket front and back print associated images of the same ticket. Typically, this is accomplished by monitoring queue marks printed by the first cylinder in the press line 102 with both imagers synchronizing the first ticket on the queue mark, repeating the cycle whenever the queue mark periodically reappears. This process works because the paper path between the two imagers (112 and 115) is initially established, and therefore, fixed and known, thus a predetermined offset is programmed into the two independent imagers with the second imager synchronizing "X" (any number of) queue marks after the first imager.

However, the hybrid press lines with at least three inline digital imager embodiments 200, 300, and 400 of FIGS. 3, 4, and 6, respectively, have a longer, more complicated paper path that can vary between print runs (e.g., one or more of the overprint fixed plate printers at stations 209 and 309 in FIG. 3, 4, or 6 may not be needed for some applications). Additionally, hybrid press line embodiments 200 and 300 of FIGS. 3 and 4, respectively, feature three different inline digital imagers with the first digital imager typically printing on the opposite side of the substrate compared to the other two second and third inline digital imagers. Thus any initial digital imager registration and/or synchronization mark is presumably printed on the opposite side of the web than subsequent imagers and fixed plate stations. This configuration is particularly troublesome in terms of registration and synchronization for the embodiment 300 of FIG. 4, since the first press timing or queue marks printed on the web would be created by the first imager 312 on the back side of the web. Furthermore, when it is realized that the hybrid press line embodiments 200 and 300 of FIGS. 3 and 4, respectively, will include two additional inline digital imagers (e.g., digital imagers 215 and 217 of FIG. 3) printing on the same side of the substrate, it can be appreciated that tighter, more accurate registration than is realized with the prior art traditional press must be maintained.

Figure 7A:
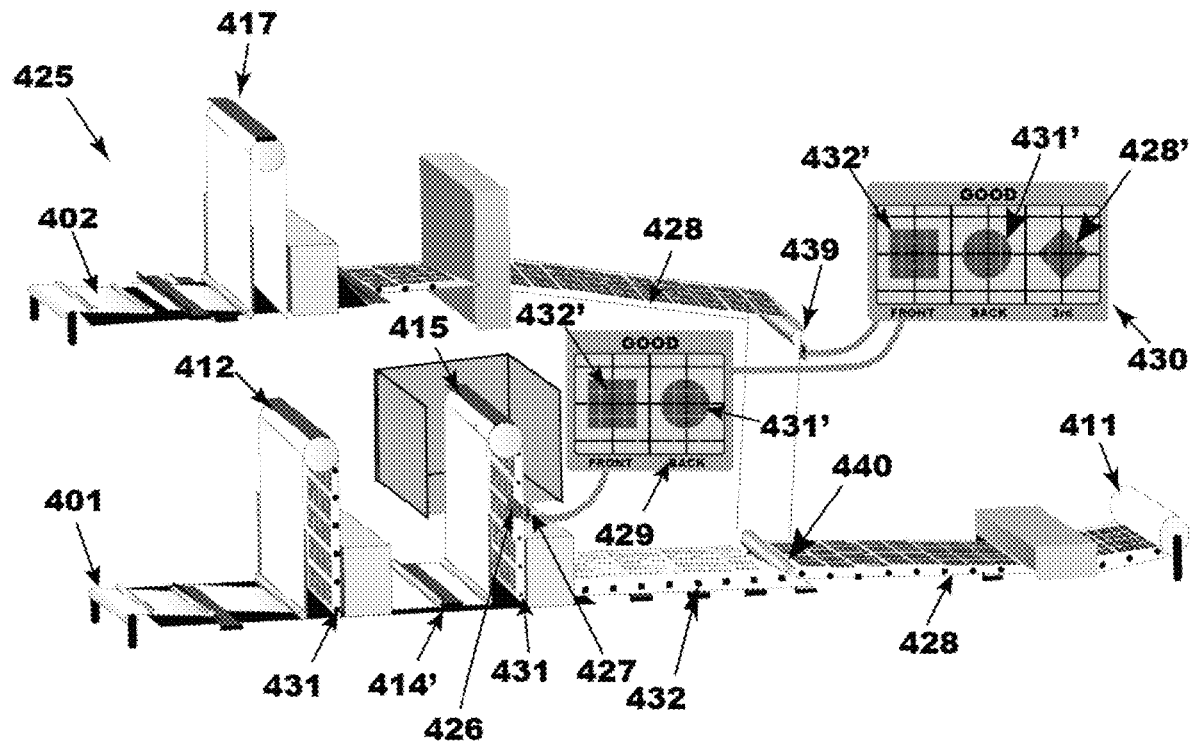
FIG. 7A is a schematic view of a representative example of imager cascading queue marks printed in the gutter of a web compatible with the embodiment of FIG. 6.

Fortunately, multiple imager synchronization, close registration, and error logging can be achieved with the use of cascading queue marks periodically printed by the multiple inline digital imagers, thereby establishing relative registration references for each imager. FIG. 7A illustrates one example embodiment of a cascading printing press line 425 applying queue marks 431 enabling the three inline digital imagers 412, 415, and 417 in the pull-tab ticket press 400 of FIG. 6 to remain in registration.

Figure 7B:
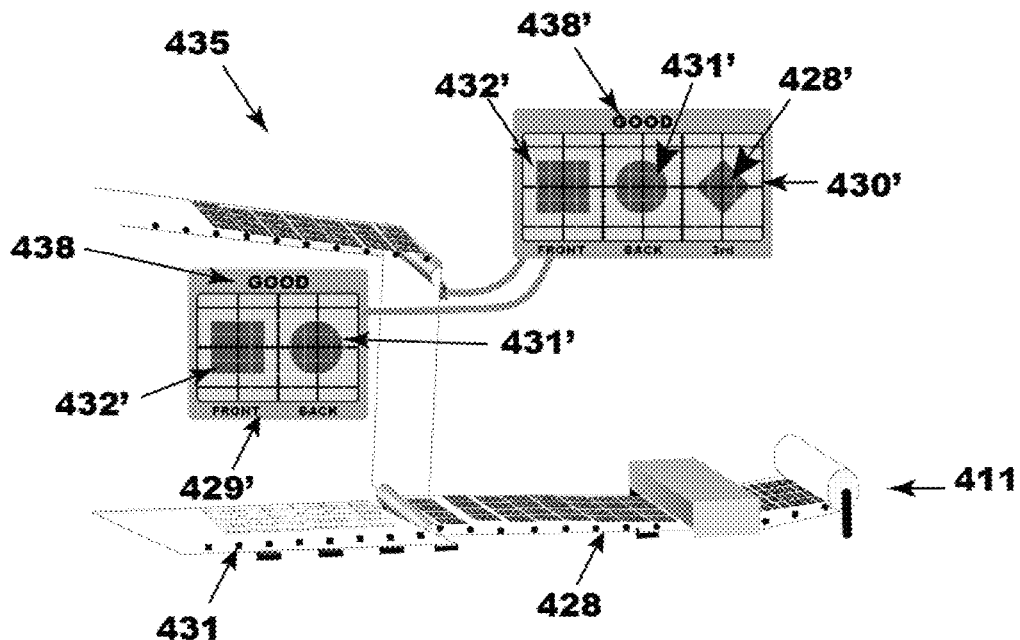
FIG. 7B is a detailed continuation of the schematic view of FIG. 7A representative example of imager cascading queue marks printed, in register, in the gutter of a web compatible with the embodiment of FIG. 6.
Figure 7C:
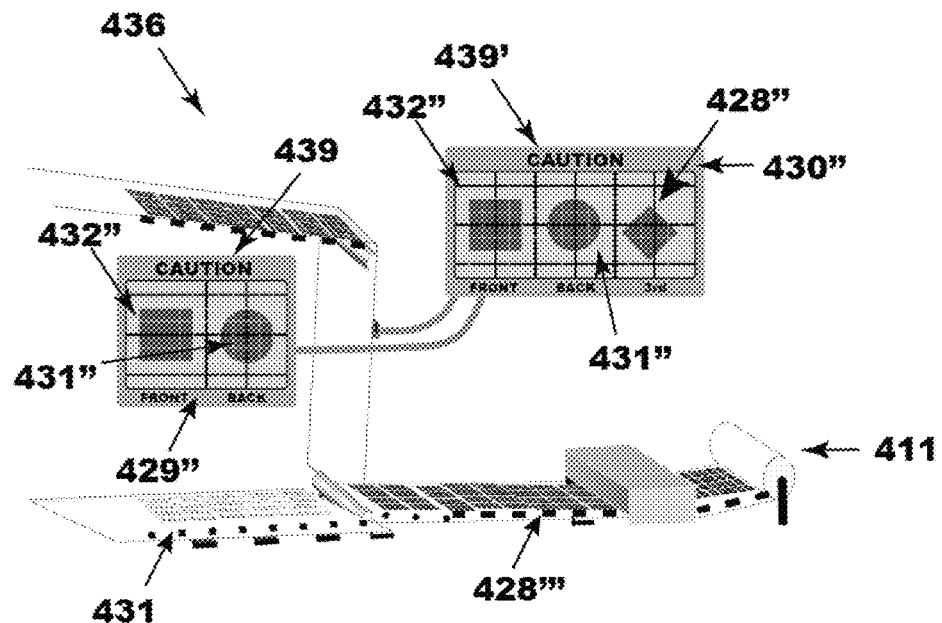
FIG. 7C is a further detailed continuation of the schematic view of FIG. 7A representative example of imager cascading queue marks printed out-of-register in the gutter of a web compatible with the embodiment of FIG. 6.

FIGS. 7A, 7B and 7C taken together illustrate one embodiment of a cascading printing press line 425 of the present invention, which seamlessly integrates three or more digital imagers into an efficient inline press system. FIG. 7A is an overall representative schematic view of an example of imager cascading queue marks printed in the gutter of a web compatible with the pull-tab embodiment 400 of FIG. 6. FIG. 7B depicts a magnified view of a portion 435 of the embodiment 425 of FIG. 7A highlighting an example where all three imagers are printing in register relative to each other. FIG. 7C depicts another magnified view of a portion 436 of the embodiment 425 of FIG. 7A illustrating an example of a partial out of register condition.

As shown in FIG. 7A, the hybrid pull-tab ticket printing press line 425 uses its first inline digital imager 412 to print the pull-tab ticket's display, optional variable non-secure indicia (e.g., inventory control barcode and/or human readable number), and the first (e.g. circle shaped) cascading queue mark 431 on the back of the web in a reserved, press side, gutter space. Since, in this example embodiment 425, the first digital imager 412 prints the first registration cascading queue mark 431 on the back of the web, subsequent print stations and digital imagers would preferably include at least one press eye focused on the web back (e.g., press eye 426, which can be a high speed Charged Coupled Device—a.k.a. "CCD"—camera) whenever referencing this cascading queue mark 431. Alternatively, a focused high intensity light source can be positioned on one side of the web thereby shining through the substrate to allow an opposing mounted press eye to detect queue marks on either side of the web.

The second inline digital imager 415 prints the pull-tabs' secure variable indicia on the front of the web after the web is flipped at station 414'. To ensure that the second inline digital imager 415 prints in registration with the first web back digital imager 412 printed product, the electronics of the second digital imager includes a press eye 426 focused on the back of the web scanning for the first cascading queue marks 431. As illustrated in FIG. 7A, this second inline digital imager 415 press eye 426 can be located any reasonable predetermined known fixed offset distance from the second inline digital imager 415 and still be used to maintain registration. In the embodiment 425, the press eye 426 focused on the back of the web is positioned downstream from the second inline digital imager 415 such that a second press eye 427 mounted directly opposite from the first press eye 426 and focused on the front of the web can compare second cascading queue marks 432 (e.g. square shaped) printed by the second inline digital imager 415 registration relative to first cascading queue marks 431 (e.g. circle shaped) confirming that the first circular printed cascading queue mark 431 is printed within the registration tolerance of the second square cascading queue mark 432.

This registration verification is diagrammatically illustrated as a virtual operator display 429 in FIG. 7A. The virtual operator display 429 provides the press operator with visual feedback as to how closely within registration tolerance the two cascading queue marks 431 and 432 are at any given time with snapshot actual or virtual images of the circular back cascading queue mark 431' and square front cascading queue mark 432' superimposed over similar grids.

An example of perfect registration of the portion 435 of the first two cascading queue marks is provided in FIG. 7B as virtual display 429'. In the example 435, the back circular cascading queue mark 431' is positioned perfectly centered on its grid with the front square cascading queue mark 432' shown with similar ideal alignment. In addition to the visual grid overlay reference, virtual display 429' also provides a qualitative evaluation of the two cascading queue marks with a display signal 438—i.e., "GOOD".

Once the pull-tab ticket substrate display and secure variable indicia are printed, the security covering pull-tab ticket substrate is imaged by the third digital imager 417 (FIG. 7A) and applied as a security layer over the secure variable indicia at adhesive application station 440. In this embodiment, the security substrate is supplied to the printing line via a web feed 402 being pulled into the third digital imager 417 where full color images are printed on the pull-tab ticket's security covering. Since the security covering pull-tab imaging is printed on a physically different substrate, no cascading queue marks are available for registration checking. Rather, the third digital imager 417 prints the security covering imaging with its own different (e.g. diamond shaped) cascading queue mark 428 printed in its web's press side gutter. These printed diamond shaped cascading queue marks 428 are scanned by a third press eye 439 positioned at an initially established, known fixed predetermined offset distance from the third digital imager 417 as well as the station 440 where the security covering web and the base web with the secure variable indicia are adhered together. As disclosed in example embodiment of the press 425, the third press eye 439 can be positioned after the third imager 417, but before the adhesion station 440 with the other web. Alternatively, the third press eye 439 can be positioned after the adhesion station 440. Regardless of its placement, the predetermined offsets between the third press eye 439 and the third imager 417 and the adhesion station 440 are maintained in an initially established system registration memory and periodically compared to the predetermined offset to the second press eye 427 along with press speed and acceleration. This information is then used to calculate the virtual registration of the third digital imager 417 relative to the second digital imager 415 and consequently to the first digital imager 412.

Similar to press registration of the first two digital imagers, the registration of the third digital imager 417 cascading queue mark 428 is diagrammatically shown in FIG. 7A as a virtual operator display 430, thereby providing the press operator with visual feedback as to how closely within registration tolerance the three cascading queue marks 431, 432, and 428 are at any given time with snapshot images of the first circular queue mark 431', the second square queue mark 432', and the third diamond shaped cascading queue mark 428' superimposed over similar grids.

An example of perfect registration of the all three cascading queue marks is provided by the printer 435 shown in FIG. 7B as virtual display 430'. In the example 435, all three cascading queue marks are positioned perfectly centered on their respective grids with a qualitative evaluation of the three cascading queue marks registration 438' "GOOD". In a second example 436 of FIG. 7C, the cascading queue mark 428 is displayed in a virtual display 430" within registration tolerance, but marginal and no longer ideal. Thus, in this example 436, the qualitative evaluation indications 439 and 439' display "CAUTION" even though the other two cascading queue marks 431" and 432" are displayed within ideal registration—i.e., any one of the cascading queue marks out of registration can be reason to reject the associated printed document. In addition to the display qualitative evaluation indications 439 and 439', the third imager 417 could also be programmed to print a warning symbol 428''' (FIG. 7C), preferably of a different color and shape (e.g., long orange rectangle) in the web gutter, thereby flagging the warning condition for packaging line personnel.

As would be understood by one skilled in the art in view of this description, the selection of cascading queue marks being basic geometric shapes (i.e., circle, square, and diamond) are for illustrative purposes and other shapes can be employed. Regardless of the shapes employed, the cascading queue marks of the embodiment 425 (FIG. 7A) maintain registration throughout the press. However, when maintaining synchronization (e.g., the back and front imaging both contain serial number information that must be synchronized on both sides of the document) is required, these types of cascading queue marks do not convey any information about which document in the queue is being imaged at any given time and therefore can only ensure registration but not synchronization.

Figure 8A:
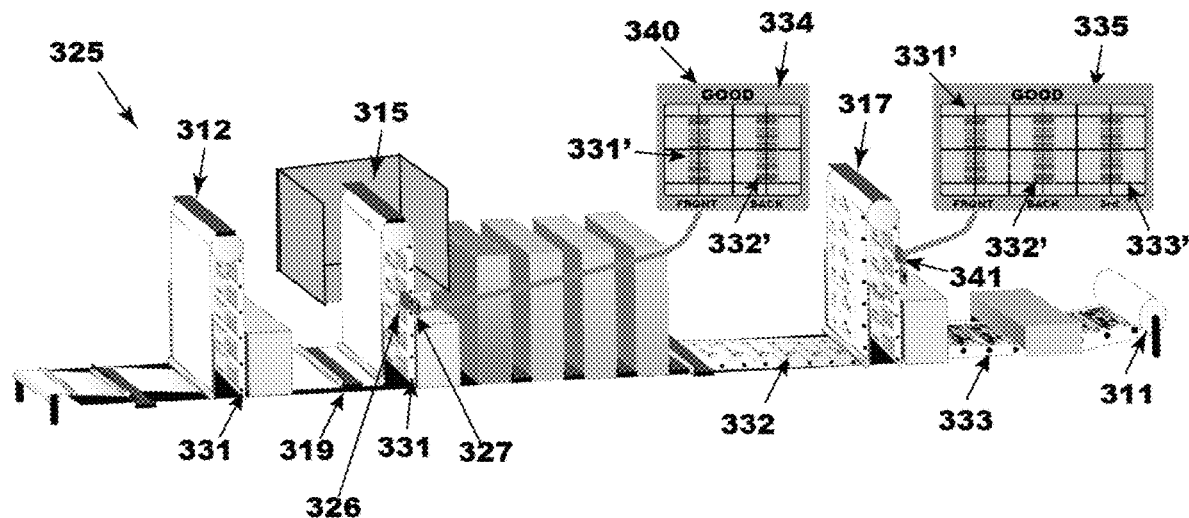
FIG. 8A is a partial schematic view of the imager cascading queue marks of FIGS. 7A through 7C configured to include serial number information compatible with the embodiments of FIGS. 3 and 4.

FIG. 8A illustrates another preferred embodiment of a press 325 where the cascading queue marks also include serial number information such that subsequent digital imagers may be cognizant not only of a periodic starting point and registration, but also of the ticket or document serial number that was previously imaged. This embodiment has the advantage of providing closed loop feedback of the ticket or document serial number to all subsequent digital imagers, thereby ensuring that each image application is coordinated with the same ticket or document as the previous image application.

Figure 8B:
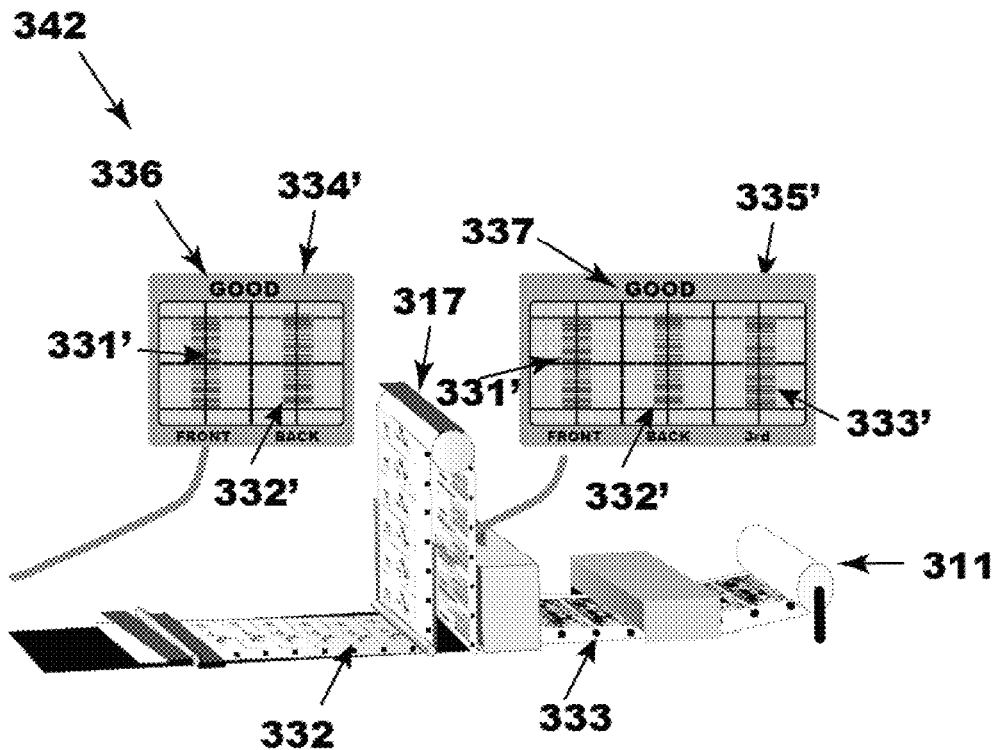
FIG. 8B is a second partial schematic view of the imager cascading queue marks of FIGS. 7A through 7C configured to include serial number information compatible with the embodiments of FIGS. 3 and 4.
Figure 8C:
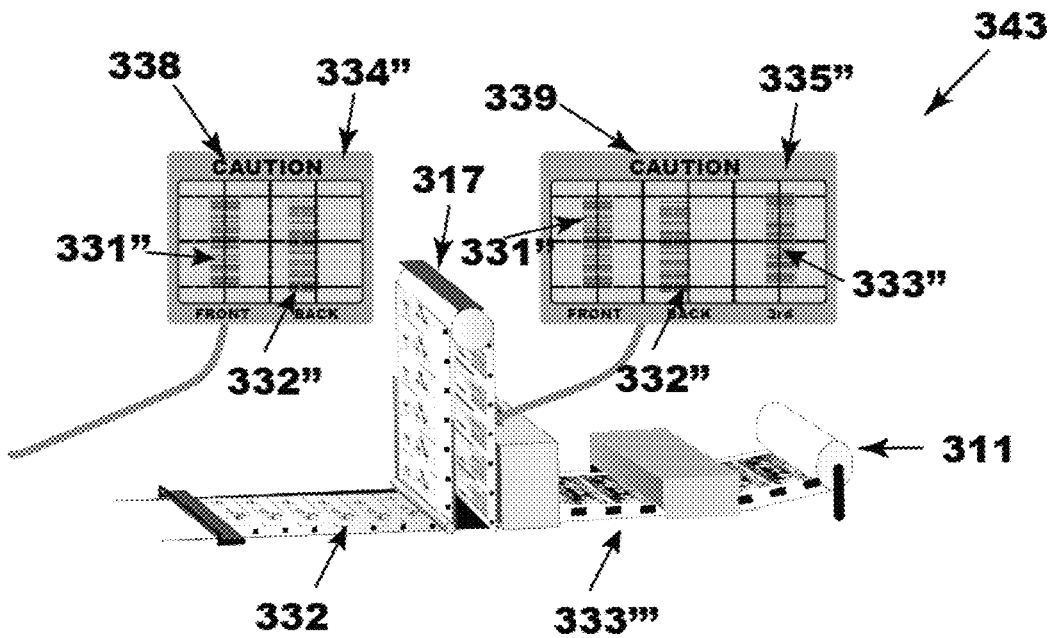
FIG. 8C is a third partial schematic view of the imager cascading queue marks of FIGS. 7A through 7C configured to include serial number information compatible with the embodiments of FIGS. 3 and 4.

FIGS. 8A, 8B and 8C taken together illustrate a preferred embodiment 325 of the present invention, seamlessly integrating three or more digital imagers into an efficient inline press system that can maintain synchronization between imagers. FIG. 8A is an overall representative schematic view of a press line 325 providing an example of imager cascading queue marks supporting synchronization printed in the gutter of a web compatible with the instant ticket embodiments 300 and 300 of FIGS. 3 and 4. FIG. 8B depicts a magnified view of a portion 342 of the embodiment 325 of FIG. 8A highlighting an example where all three imagers are printing in register and synchronization relative to each other. FIG. 8C depicts another magnified view of a portion 343 of the embodiment 325 of FIG. 8A illustrating an example of a partial out of register condition.

FIG. 8A illustrates one example embodiment of a hybrid printing press line 325 using cascading queue marks enabling the three inline digital imagers 312, 315, and 317 in the instant ticket press 300 of FIG. 4 to remain in registration and synchronization. As shown in FIG. 8A, the embodiment of the hybrid instant ticket printing press line 325 uses its first inline digital imager 312 to print the ticket's backing legal text, display, variable non-secure indicia, as well as the first cascading queue mark 331 on the back of the web. However, in this embodiment, rather than being a simple geometric shape that only conveys registration information, the first cascading queue mark 331 also includes serial number information of the document imaged. The additional serial number information thereby identifies the unique printed document to all subsequent digital imagers and devices downstream in the printing press. The exact embodiment of the cascading queue mark 331 can vary from a barcode 331 and 331' or some other form of cyclic numbering (e.g., miniature grid where each square in a grid represents a binary bit, QR code, pie chart, etc.), the significant concept being the cascading queue marks embody document synchronization information in addition to registration information. In the example of the embodiment 325 of FIG. 8A, the first cascading queue marks 331 (as well as subsequent queue marks) are a standard Code 39 barcode, thereby theoretically encapsulating almost all conceivable document numbers. Since in this example embodiment 325 the first digital imager 312 prints the first registration cascading queue mark 331 on the back of the web, subsequent fixed plate print stations and digital imagers would preferably include a press eye focused on the web back (e.g., 326) whenever referencing this first cascading queue mark 331. In addition to monitoring registration, in this embodiment, the press eye 326 must also be capable of decoding the embedded synchronization information.

The second inline digital imager 315 prints the instant ticket secure variable indicia on the front of the web after the web is flipped at station 319. To ensure that the second inline digital imager 315 prints within registration and synchronization of the first (web back) digital imager 312 printed product, the electronics of the second digital imager 315 includes a press eye 326 focused on the back of the web scanning for first cascading queue marks 331. As before, the press eye 326 of this second inline digital imager 315 can be located any reasonable predetermined known fixed offset distance from the second inline digital imager 315 and still be used to maintain registration and synchronization. In the preferred embodiment 325, the press eye 326 focused on the back of the web is positioned downstream from the second inline digital imager 315 so that a second press eye 327 mounted directly opposite from the first press eye 326 and focused on the front of the web can compare registration of the second cascading queue marks 332 printed by the second inline digital imager 315 relative to the first cascading queue marks 331, confirming or noting differences in registration and synchronization—i.e., ensuring the first 331 and second 332 cascading queue marks decode to the same value.

This registration and synchronization verification is diagrammatically illustrated as a virtual operator display 334, thereby providing the press operator with visual feedback as to how closely within registration tolerance the two cascading queue marks 331' and 332' are at any given time with snapshot images of the cascading queue marks superimposed over similar grids. An out of synchronization condition would be identified in the display with a color change (e.g., green to red or other visual or audible warning) of the two cascading queue marks 331' and 332' display, as well as the nonequivalent decoded synchronization numbers superimposed on the display. Additionally, the qualitative evaluation indication of the two cascading queue marks 340 would display an indication of the condition—e.g., "OUT-OF-SYNC" if the queue mark sequence images are not correct relative to each other.

Once the instant ticket back and secure variable indicia (and optionally display) are printed, the inline fixed plate stations apply the release coat, upper opacity layer(s), and white SOC coatings. The third inline imager 317 then prints the overprint on top of the SOC and optionally the display. At this point another press eye 341 is focused on the third imager's 317 printed cascading queue marks 333 in the front gutter of the web. The predetermined offsets between the third press eye 341 and the third imager 317 are maintained in system registration memory and periodically compared to the predetermined offset to the second press eye 327 along with press speed. This information then is used to calculate the virtual registration of the third digital imager 317 relative to the second digital imager 315 and consequently to the first digital imager 312. Alternatively, a complete set of press eyes (i.e., the back press eye 326, the front press eye 327 focused on the cascading queue mark 331 of the second digital imager 315, and the front press eye 341 focused on the cascading queue mark 333 of the third digital imager 317) can be included in proximity to the third digital imager. Regardless of the arrangement of the press eyes, the registration and synchronization of the cascading queue mark 333 of the third digital imager 317 is diagrammatically shown in the virtual operator display 335, thereby providing visual feedback of registration tolerance of all the three cascading queue marks 331', 332', and 333', as well as synchronization status.

An example of perfect registration and synchronization 342 of all three cascading queue marks is provided in FIG. 8B as a virtual display 335'. In example 342, all three cascading queue marks 331', 332', and 333' are positioned perfectly centered on their respective grids with a qualitative evaluation of the three cascading queue marks registration and synchronization 337 "GOOD" also displayed. In FIG. 8C a slightly out of register example 343 is displayed in virtual display 335" with cascading queue mark 332" within registration tolerance, but marginally low and therefore no longer ideal. Thus, in this example 343, the qualitative evaluation indications 338 and 339 indicate "CAUTION" on both displays 334" and 335", even though the other two cascading queue marks 331" and 333" are within ideal registration. In addition to the display qualitative evaluation indications 338 and 339, the third digital imager 317 could also be programmed to print warning indicia 333'" (FIG. 8C), preferably of a different color (e.g., orange barcode) in the web gutter, thereby flagging the warning condition for packaging line personnel.

In the event that registration between the cascading queue marks exceeds predefined tolerances or the cascading queue marks fall out of synchronization, any resulting printed product would be defective and consequently voided and removed during the packaging process. As previously described, the press monitors called virtual displays provide operators with warnings, preferably visual feedback of printing status, and would provide an escalated alarm under these conditions. Optionally, it is also possible to program the most downstream digital imager to void defective printed product both in the cascading queue mark gutter as well as directly across the product facing itself.

Figure 9A:
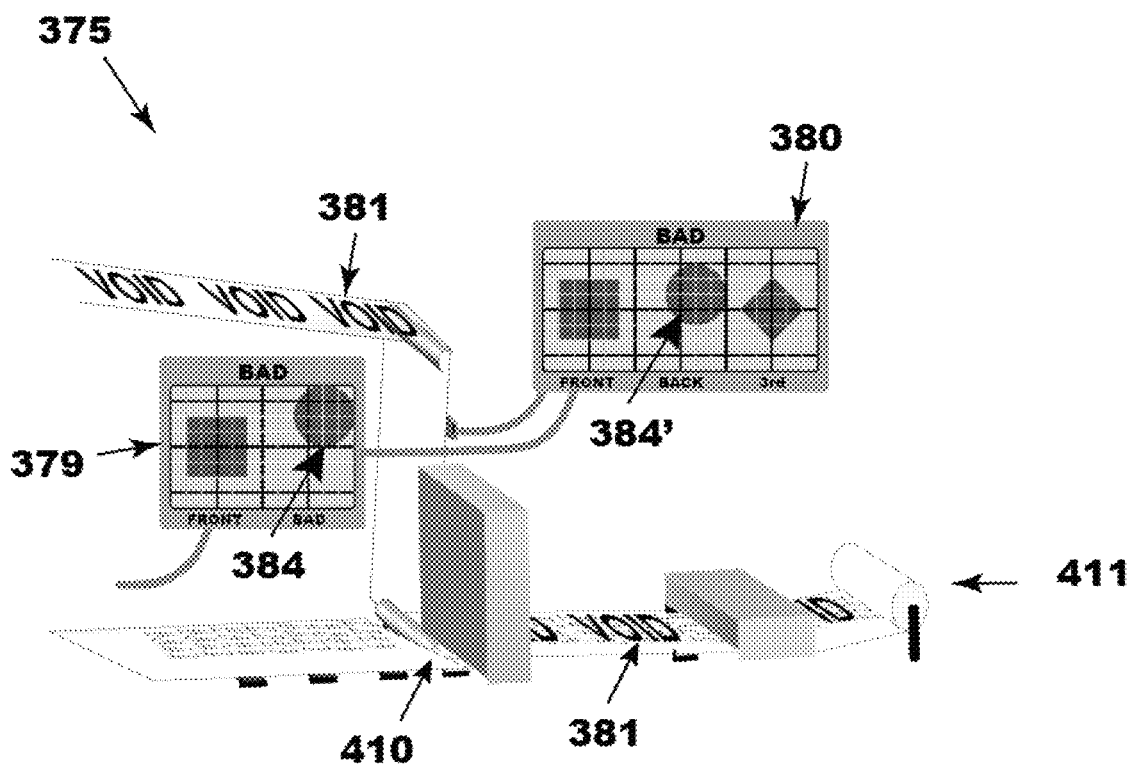
FIG. 9A is a partial schematic view of the imager cascading queue marks of FIGS. 7A through 7C and 8A through 8C conveying failures, as well as how the detected failures would be flagged and imaged with an imager.
Figure 9B:
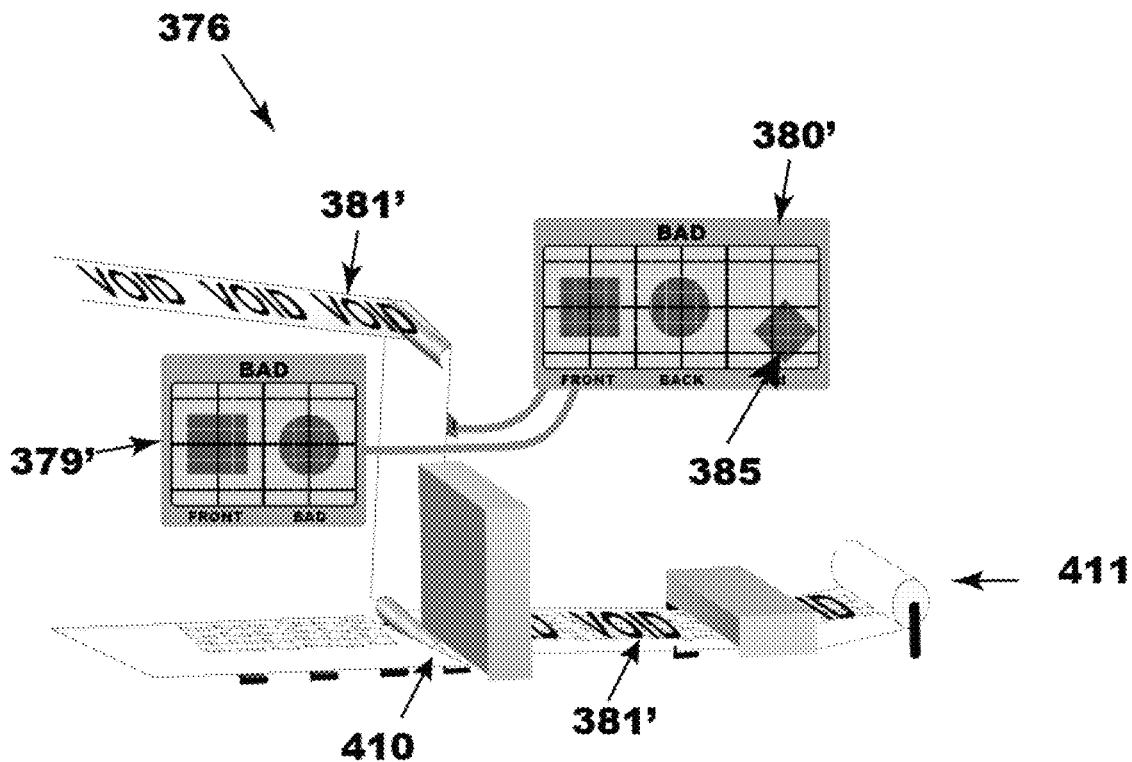
FIG. 9B is a second partial schematic view of the imager cascading queue marks of FIGS. 7A through 7C and 8A through 8C conveying failures, as well as how the detected failures would be flagged and imaged with an imager.
Figure 9C:
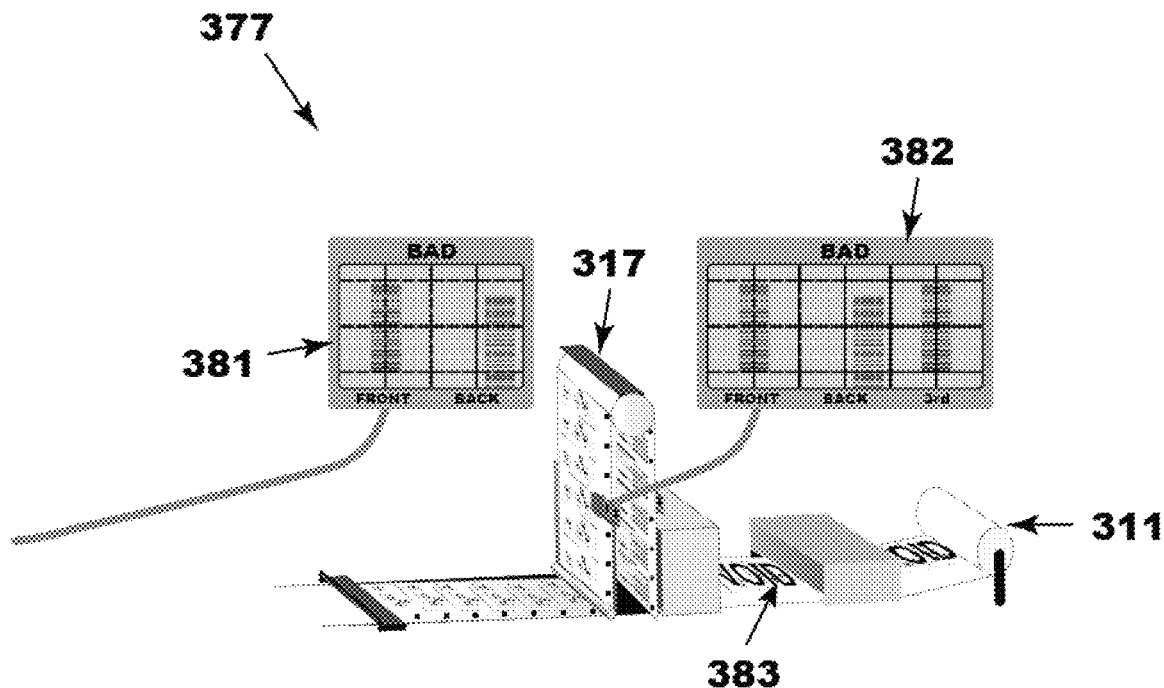
FIG. 9C is a third partial schematic view of the imager cascading queue marks of FIGS. 7A through 7C and 8A through 8C conveying failures, as well as how the detected failures would be flagged and imaged with an imager.
Figure 9D:
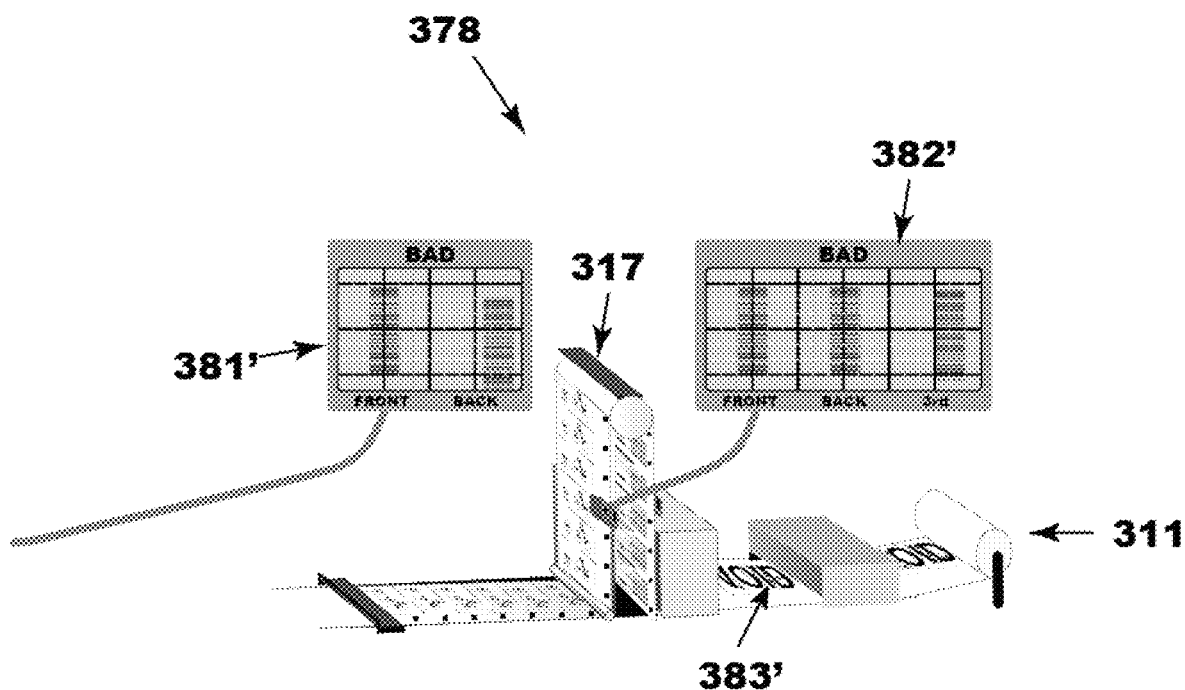
FIG. 9D is a fourth partial schematic view of the imager cascading queue marks of FIGS. 7A through 7C and 8A through 8C conveying failures, as well as how the detected failures would be flagged and imaged with an imager.

FIGS. 9A, 9B, 9C and 9D taken together illustrate various representative embodiments of systems 375 through 378 respectively utilizing a downstream imager to visually void product for ease of QA inspection and culling. FIGS. 9A and 9B provide representative examples of systems 375 and 376 of downstream imager voiding product compatible with the pull-tab embodiments 400, 425, 435 and 436 of FIGS. 5 and 7A through 7C. FIGS. 9C and 9D provide representative examples of systems 377 and 378 of downstream imager voiding product compatible with the instant ticket embodiments 400, 425, 435, and 436 of FIGS. 3, 4, and 9C through 9D.

FIGS. 9A and 9B provide representative illustrations of systems 375 and 376 (respectively) of the same embodiment that utilizes the most downstream digital imager in the exemplary pull-tab ticket press line of FIGS. 6 and 7A through 7C to visually void defective product. In the exemplary pull-tab press line upstream registration failure 375 of FIG. 9A, the back imager cascading queue marks 384 and 384' are too far out of registration relative to the front variable indicia cascading queue mark 379 to produce a useable product. In this case, the downstream digital imager (not shown in FIG. 9A) automatically prints "VOID" 381 across the web, thereby flagging the defective product such that it will be removed and destroyed during the packaging process. As shown in system 376 of FIG. 9B, this voiding 381' of the printed product can even be implemented if the most downstream digital imager (not shown in FIG. 9B) is producing the defective product by being grossly out of register per the display 385. However, in this case, depending on the arrangement of the press eyes, it is possible that some small number of defective product would not be voided out by the most downstream digital imager. Typically, this should not be problematic, since both pull-tab tickets and scratch-off instant tickets are arranged in packs and for both logistical and practical reasons, fractions of a pack are never shipped to wholesale or retail marketers. Nevertheless, to guard against the extremely rare occurrence of a cascading queue mark error being detected and flagged exactly at the beginning of a new pack on the web with some defective product already downstream of the void flagging, one or two packs ahead of the voided packs should also be destroyed as a normal operating procedure.

FIGS. 9C and 9D provide representative illustrations of systems 377 and 378 (respectively) of the same embodiment that utilizes the most downstream digital imager in the exemplary instant ticket press line of FIGS. 3, 4, and 8A through 8C to visually void defective product. The exemplary scratch-off instant ticket press line failure detection and flagging of synchronized cascading queue marks illustrated with respect to systems 377 and 378 are similar to the previous pull-tab ticket press examples. In both examples of systems 377 and 378, out of registration conditions are detected and graphically displayed on the operator screens 381, 381', 382 and 382' with the downstream digital imager 317 automatically printing "VOID" 383 and 383' across the web, thus flagging the defective product to be removed and destroyed during the packaging process. Additionally, in the embodiments of systems 377 and 378 of synchronized cascading queue marks, an out of synchronization condition could also trigger documents to be voided.

Figure 10:
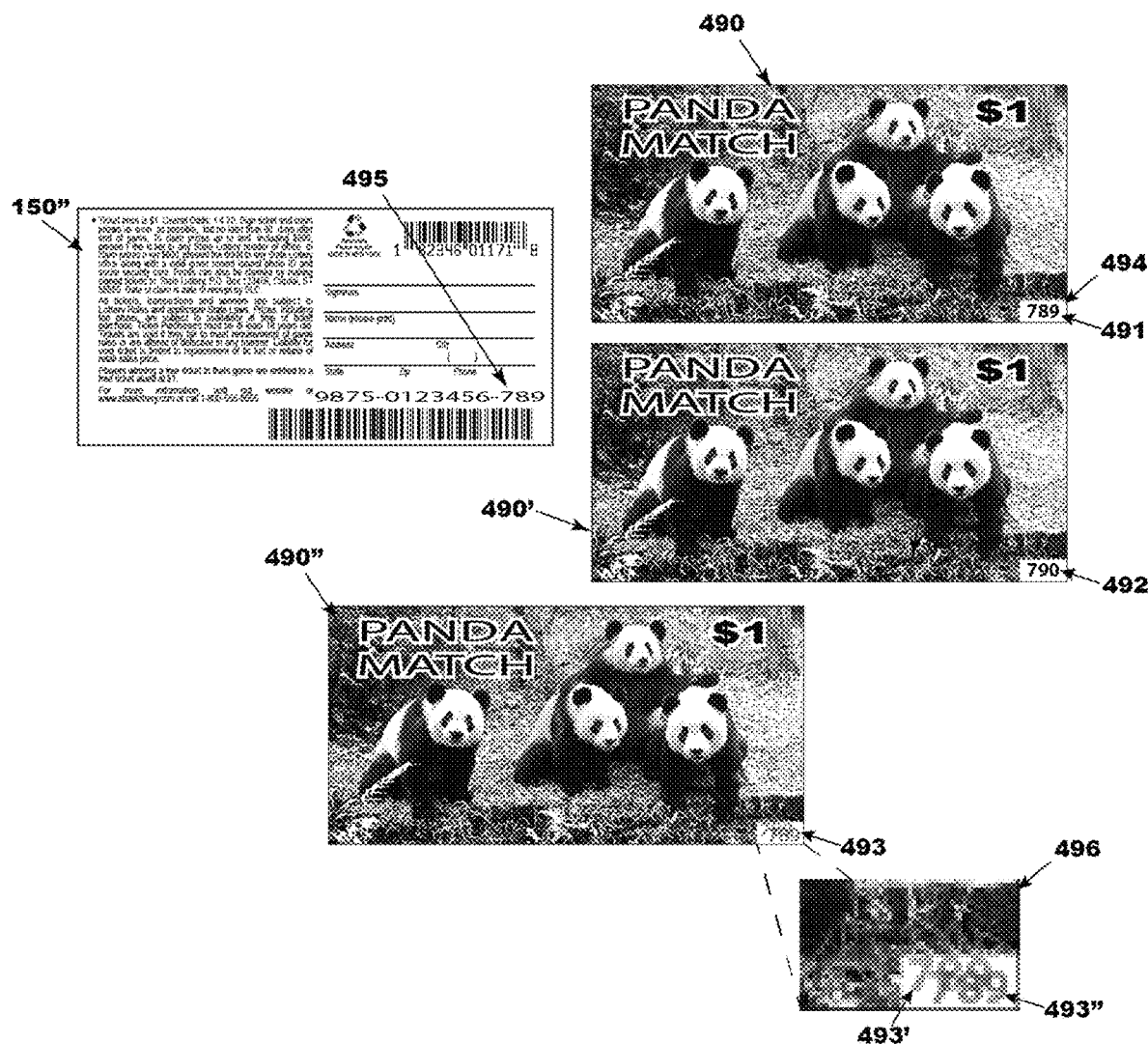
FIG. 10 is an exemplary plan view of a scratch-off ticket with human readable cascading queue marks that can be employed for Quality Assurance (QA).

This is not to imply that cascading queue marks can only be embodied in machine-readable formats. It is also possible to create cascading queue marks that are human readable. These human readable embodiments of cascading queue marks have the advantage of allowing human QA inspectors to ensure that the final documents were produced both in registration and synchronization with multiple digital imagers. For example, FIG. 10 illustrates an exemplary representative example of a scratch-off lottery-type instant ticket 150" like that of FIG. 2 with the addition of human readable cascading queue marks 491 in the form of decimal digits identifying the printed document's ticket number in the pack. As shown in FIG. 10, the instant ticket front 490 includes a notched out window 494 from the ticket's display portion containing human readable cascading queue marks 491 printed by both the front variable indicia and overprint digital imagers (e.g., digital imagers 315 and 317 respectively of FIG. 4) on the same print line. Both the front indicia and overprint digital imagers print human readable cascading queue marks 491 (FIG. 10) by printing the queue marks 491 in tandem in process color—e.g., the front indicia digital imager portion of the cascading queue marks 491 may print the "CM" of the process color composite of CMYK ink with the overprint digital imager printing the "YK" portion.

Human readable cascading queue mark 491 represents ticket number "789" assigned to this particular ticket in the pack. This is the same ticket number 495 printed on the ticket back 150" by the back digital imager (e.g., the digital imager 312 of FIG. 4). Thus, the human readable cascading queue marks 491 and 495 (FIG. 10) ensure that all three digital imagers (in this example) are in synchronization with each other by printing the same variable ticket-document number "789" in the printing queue. For example, if the back digital imager were to become out of synchronization with the front two digital imagers the back would display a different human readable cascading queue mark 496 (e.g., "789") than would appear as the ticket front 490' human readable cascading queue mark 492 (i.e., "790") as illustrated in FIG. 10.

In addition to synchronization, human readable cascading queue marks also have the advantage of verifying registration from one digital imager to another when printed on the same side of the substrate. For example, in FIG. 10, the ticket front image 490" provides a simulated out of register condition 493 between the front variable indicia and overprint digital imagers, even though both digital imagers are in correct synchronization with each other. This simulated out of register condition is magnified in 496 to illustrate the variable indicia imager's "CM" printed image 493' out of register with the overprint imager's "YK" image 493", which in this example includes the ticket's display. This out-of-register information for the variable indicia printed image is particularly valuable, since the ticket's variable indicia is normally covered by a SOC on the completed ticket and therefore cannot be viewed by QA personnel in a non-destructive process.

In addition to maintaining registration and synchronization between multiple imagers, there is also the problem of Raster Image Processor (RIP) bandwidth limitations heretofore unaddressed in the prior art. Present state of the art (i.e. prior art) lottery instant ticket indicia printing technology typically employs one-bit (i.e., ink on or off) raster imaging at 240 dpi (dots per inch). However, the embodiments of hybrid press lines 200, 300, and 400 with at least three inline digital imager (FIGS. 3, 4 and 6, respectively) employ four-color digital imaging typically offering 8-bit-per-color intensity (i.e., 32-bits total per dot for Cyan, Magenta, Yellow, and blacK—CMYK) or more with possible resolutions in excess of 500 dpi. Thus, in an exemplary embodiment of 8-bit four-color (i.e., 32-bits total) imaging at 800 dpi, the amount of data required for four-color indicia printing increases by over 355 times per square inch of printing surface verses monochromatic or spot color. Even by modern computing standards, an increase of over 355 times in the amount of data per variable square inch of instant ticket surface is a challenge to process by a RIP when multiplied by typical print run volumes of 10,000,000 to 500,000,000 tickets and running at press speeds of 500 FPM (Feet Per Minute). When it is considered that the display and overprints are imaged in addition to the variable indicia, it can be appreciated that the data handling volumes grow almost exponentially.

The associated digital imager RIP bandwidth required to handle this vast amount of digital imager data further compounds the problem of four-color imaging of lottery tickets and again helps to explain why the industry favors fixed plate printing with only monochromatic variable indicia imaging. For example, assume that instant lottery tickets are printed with variable imaging across a narrow one-foot wide web at a low print speed of 100 FPM. For monochromatic (1-bit) imaging at 240 dpi, a continuous RIP data bandwidth of over 103 megabytes-per-minute (about 1.7 MB/second or about 14 megabits-per-second—14 Mbps) would be required to not pause the printing process. By contrast, four-color RIP imaging (i.e., 32-bit at a higher resolution) over the same narrow web width (one foot) and relatively slow speed (100 FPM) will require an aggregate imager bandwidth of almost 37 billion-bytes-per-minute (about 617 MB/second or about 5 billion-bits-per-second—5 Gbps). To compound this problem, instant lottery tickets require variable data for their variable win-loss indicia (as a minimum). In order to implement variable data in vector languages (e.g., PostScript), typically high-level functions (e.g., transparency) are called to overlay the variable data on a static background. These high-level functions are typically processor intensive and consequently add even more processor burden on the imager RIP. Thus, even with modern computing processing, it becomes unrealistic to expect a single imager RIP to be able to deliver full-color printing for display, variable indicia, and overprints at the desired speeds.

Figure 11:
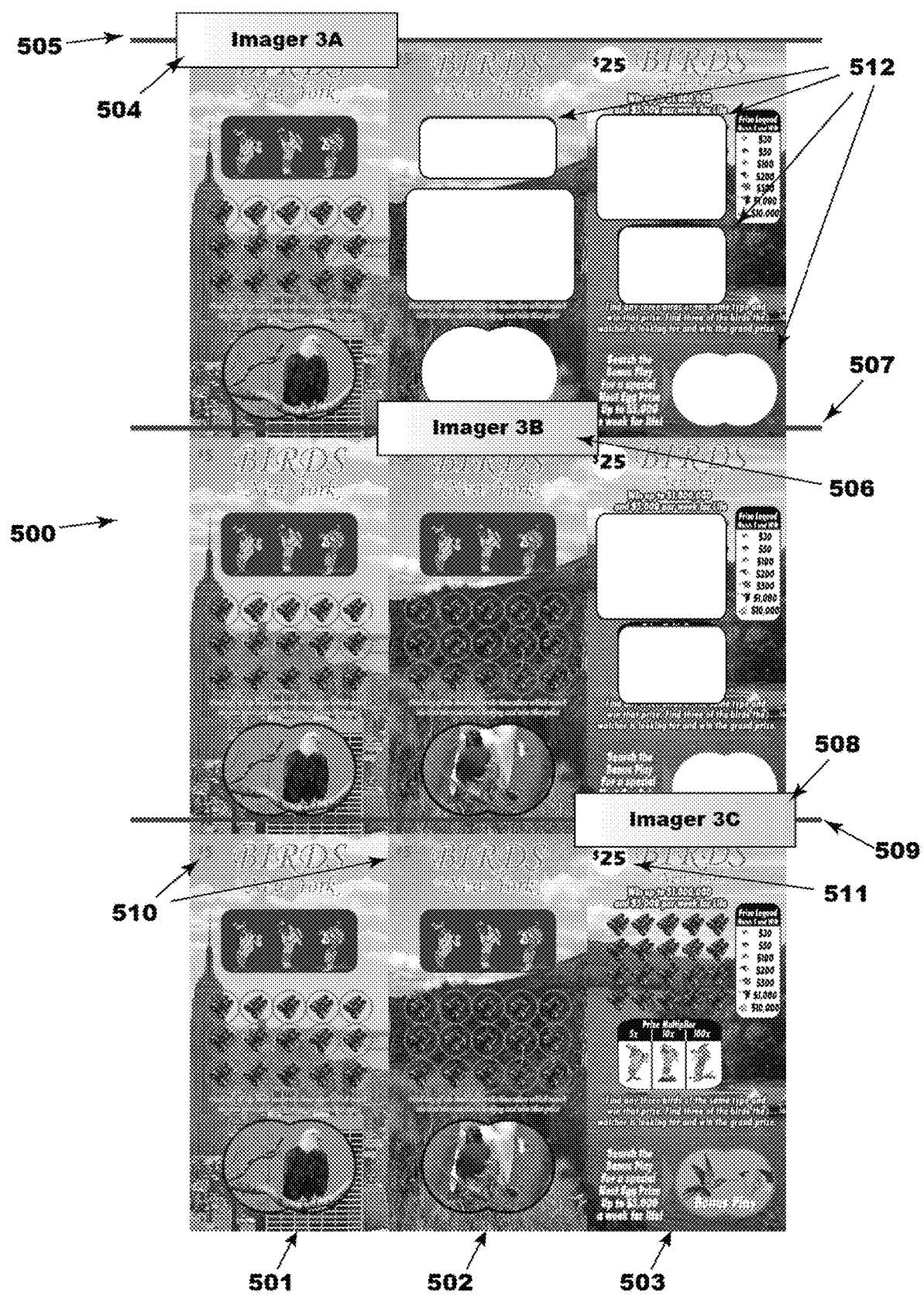
FIG. 11 is a schematic illustration providing a graphical overview of a first exemplary embodiment of dividing the imaging load among multiple Raster Image Processors (RIPs) into various streams, which is compatible with the embodiments of FIG. 3, FIG. 4, and FIG. 6.
Figure 12:
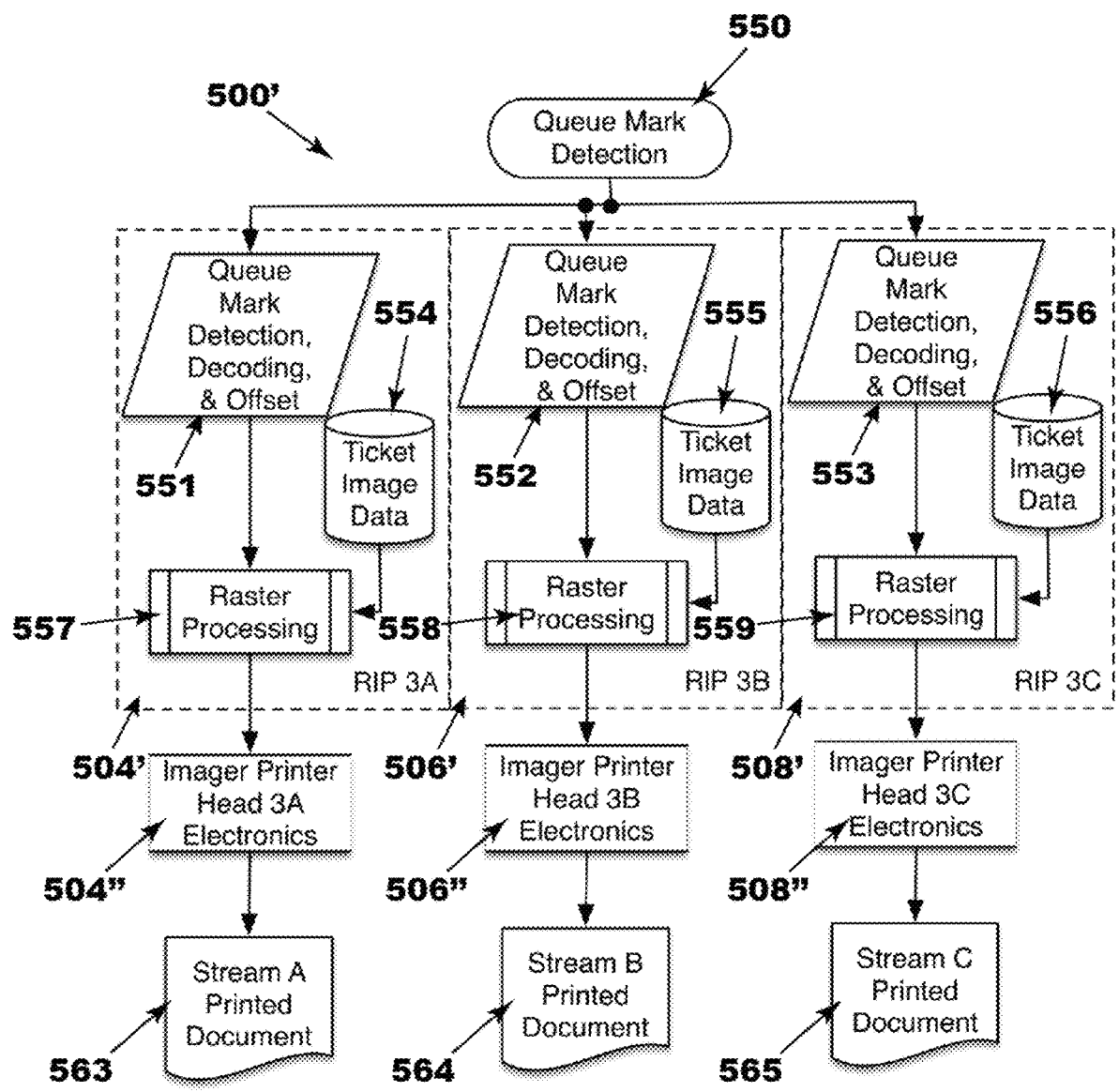
FIG. 12 is a system architecture flow diagram providing a graphical logic flow of the embodiment of FIG. 11.

FIGS. 11 and 12, taken together, illustrate one embodiment 500 and 500' for dividing the imager RIP processing bandwidth requirements among multiple individual processors on a per stream basis. FIG. 11 is a schematic illustration showing an embodiment 500 for dividing the imager RIP processing bandwidth requirements among multiple individual processors. FIG. 12 is the corresponding system architecture flow diagram 500' providing a graphical logic flow of the same embodiment.

As shown in FIG. 11, three channels of instant lottery tickets are imaged in different streams 501, 502 and 503 across a common web. In this embodiment, three different physical digital imager print heads 504, 506 and 508 are configured staggered across the web suspended by different rods 505, 507 and 509, respectively, thereby enabling each physical digital imager print head 504, 506 and 508 to print the images for its designated stream 501, 502 and 503, respectively. By dividing the web imaging into separate streams 501, 502 and 503 with associated digital imager print heads 504, 506 and 508, each responsible for its own stream, it becomes possible to assign separate physical imager RIPs to each stream, thereby dividing the imager RIP processor bandwidth requirements by the number of streams—e.g., by a factor of three as illustrated in FIG. 11.

In the example of FIG. 11, the physical imager print heads 504, 506 and 508 of the three individual streams 501, 502 and 503 are illustrated staggered in the direction of web motion. However, all three physical imager print heads 504, 506 and 508 are part of the same overprint third digital imager 217 and 317 of FIG. 3 and FIG. 4 applying the overprint imaging over the upper opacity and SOC layers 512 (FIG. 11) at different times. This physical staggering in the direction of web motion allows for each physical imager print head 504, 506 and 508 to slightly overlap its designated stream 501, 502 and 503, thereby allowing for blending and variable width tickets. Of course, as would be apparent to one skilled in the art in view of this disclosure, an alternate embodiment of the multiple physical imager print heads mounted in a common row may under some circumstances (e.g., space limitations) be more desirable.

As a side benefit of this embodiment 500, different games can be readily assigned to different streams. For example, as illustrated in FIG. 11, the streams 501 and 502 are printing one "$5" retail version 510 of the same game with the stream 503 printing a different "$25" retail version 511. By using separate digital imager RIPs for each stream, logistical concerns (e.g., fewer number of tickets required for one game verses another, different indicia) are minimized and a failure of one digital imager RIP does not necessarily negate the entire press run. After printing, the different streams 501, 502 and 503 are slit from the common web and packaged individually.

As shown in FIG. 11, the three physical imager print heads 504, 506 and 508 of embodiment 500 are part of the same overprint third digital imager 217 and 317 of FIG. 3 and FIG. 4. This same set-up of three physical digital imager print heads would be replicated for the ticket back and front indicia digital imagers 212 and 215 of FIGS. 3 and 312 and 315 of FIG. 4, respectively. Depending on the available digital imager RIP processing bandwidth, one RIP server may be configured to process the data for all physical digital imager print heads (e.g., digital imagers 212, 215 and 217 of FIG. 3) in its stream, conceivably simplifying synchronization of ticket back, front variable indicia, and overprint. Conversely, if the imager RIP processing bandwidth requirements exceed the ability of one RIP server to maintain press speed per stream, multiple RIP servers may be implemented for each stream—e.g., one RIP server for each stream of the first digital imager 312, one RIP server for each stream of the second digital imager 315, and one RIP server for each stream of the third digital imager 317 of FIG. 4 (i.e., twelve RIP servers total for the embodiment 300 of FIG. 4).

The system architecture flow diagram 500' of FIG. 12 for the embodiment of the system 500 features three individual RIPs 504', 506' and 508' that are discretely interfaced to separate imager printer head electronics 504", 506" and 508", respectively. Thus, each RIP and associated printer head and electronics is only responsible for printing its designated stream of instant tickets or documents (i.e., one for each stream 501, 502 and 503 of FIG. 11) with no interaction between the discrete RIPs. In this embodiment, each independent RIP server 504', 506' and 508') would trigger off of common queue marks printed on the web 500 to maintain registration as shown at steps 551, 552 and 553. In the event the queue marks include synchronization data (i.e., ticket or document pointer data indicating which ticket or document is to be imaged in a cycle), each RIP server would also decode the cyclical queue mark data at 551, 552 and 553 to ensure image synchronization across imagers (i.e., back, front variable indicia, and overprint) in the press line. Additionally, if the individual imager printer heads are staggered in the direction of web motion as shown at staggered printer heads 504, 506 and 508 of FIG. 11, and a common queue mark detector 550 (FIG. 12) is employed for all stream RIP servers, predetermined offsets may be added as shown at steps 551, 552 and 553 to compensate for the difference between when the queue mark is detected at step 550 and when the physical print head should begin imaging of a particular ticket due to its staggered position (see embodiment of the system 500 of FIG. 11). Alternatively, non-staggered print heads (i.e., inline or parallel relative to each other along the web 500) can be accommodated with separate queue mark detectors inline for each physical print head.

Regardless of the queue mark processing method, the raster Central Processing Units (CPUs) 557, 558 and 559 of FIG. 12 receive the timing and/or synchronization signals from the queue mark detection and processing logic 551, 552 and 553, access the appropriate high-level (e.g., PostScript) ticket or document image data from memory 554, 555 and 556 and along with other processing, convert the high-level ticket graphic images to raster graphics structure suitable for processing by the associated physical print head electronics 504", 506" and 508". Once the associated physical print head electronics 504", 506" and 508" receive the raster graphics data, the accompanying print heads print the ticket or document data in the appropriate stream 563, 564 and 565.

Thus, the embodiment of the system 500 with its flow diagram 500' of FIGS. 11 and 12 has the advantages of architectural simplicity and bandwidth reduction by assigning a discrete RIP processor to each print stream on the web with the disadvantages of the added complexity of dividing the various print streams during prepress conversion as well as difficulty in coordinating imaging across the various print streams. Additionally, if it is desirable for the on-press RIPs to decrypt ciphertext variable indicia in real time for maximum security, the logistics for managing the encryption and decryption keys are substantially more complex with each discrete RIP preferably having its own decryption key.

Figure 13:
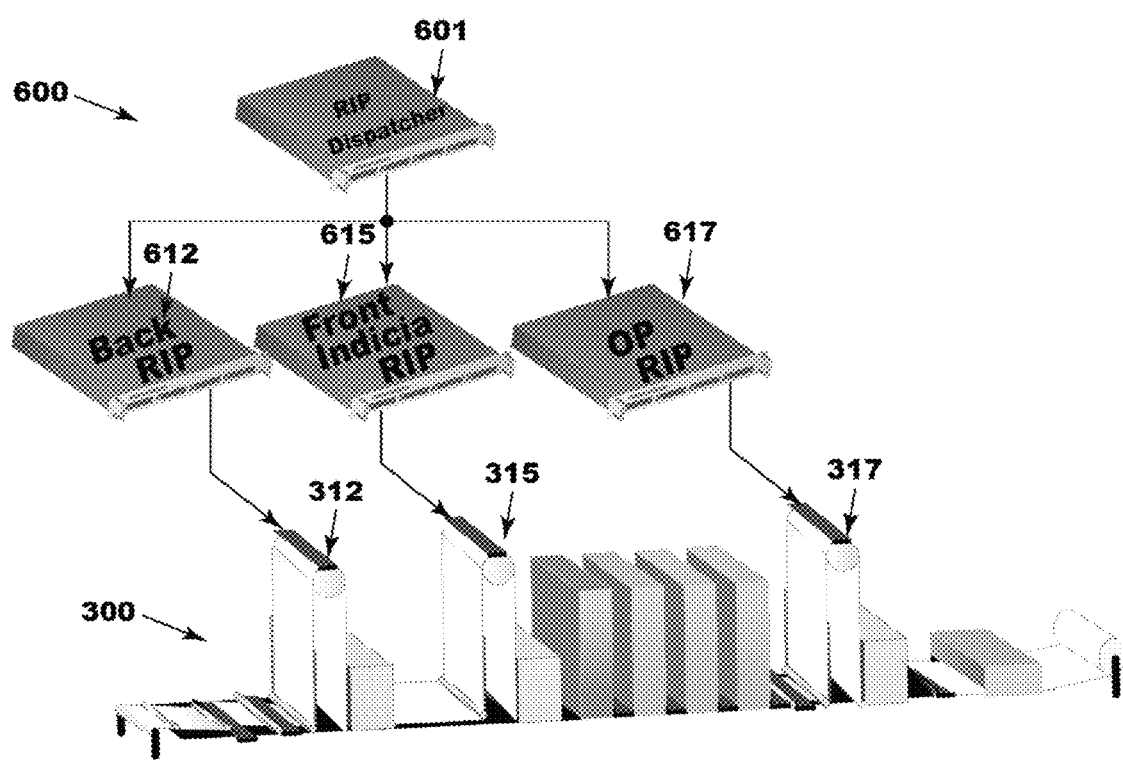
FIG. 13 is a schematic illustration providing a graphical overview of a second exemplary embodiment of dividing the imaging load among multiple RIPs by imagers, which is compatible with the embodiments of FIG. 3, FIG. 4, and FIG. 6.
Figure 14:
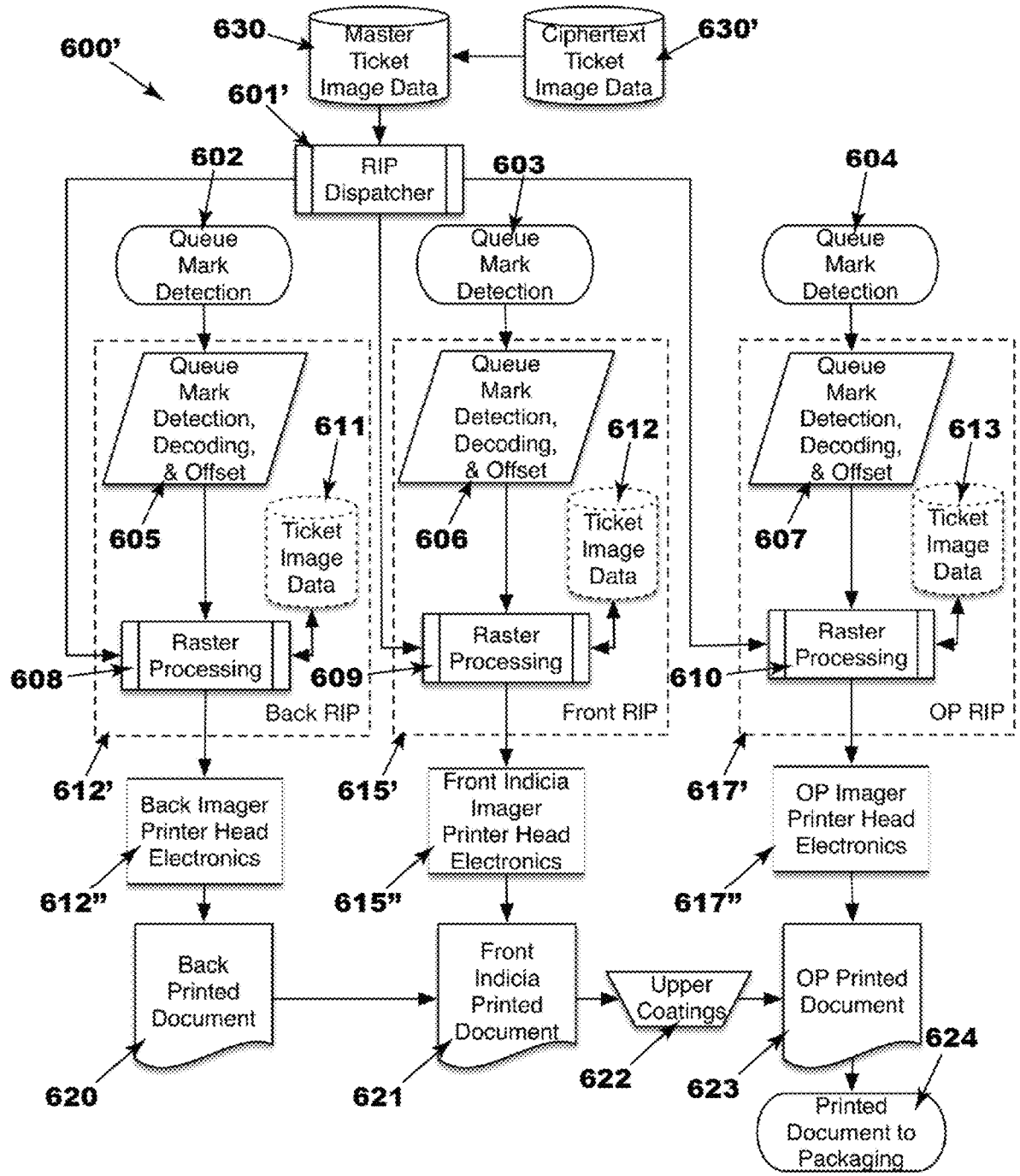
FIG. 14 is a system architecture flow diagram providing a graphical logic flow of the second embodiment of FIG. 13.

FIGS. 13 and 14 taken together illustrate one embodiment of a print system 600 with its architecture flow diagram 600' for dividing the imager RIP processing bandwidth requirements among multiple individual processors on a per digital imager basis. FIG. 13 is a schematic illustration showing an embodiment 600 for dividing the imager RIP processing bandwidth requirements among multiple individual processors with each processor interfaced to a separate print station on the web coordinated by a common RIP dispatcher 601. FIG. 14 is the corresponding system architecture flow diagram 600' providing a graphical logic flow of the same embodiment.

FIG. 13 is a schematic illustration showing an embodiment 600 for dividing the digital imager RIP processing bandwidth requirements among multiple individual processors with one RIP processor per digital imager station (e.g., ticket back 612, front display and variable indicia 615, and overprint—"OP" 617). For added clarity, the embodiment 600 is shown interfacing its multiple RIPs to the three digital imager stations first digital imager 312 "Back", second digital imager 315 "Front Indicia", and third digital imager 317 "OP" of embodiment 300 of FIG. 4. While the embodiment 300 of FIG. 4 is presented interfaced to embodiment 600 in FIG. 13, it should be understood that the same conceptual interface could be readily accomplished with the embodiment 200 of FIG. 3 or the embodiment 400 of FIG. 6.

As illustrated in FIG. 13, each of the different inline press digital imager stations 312, 315 and 317 are interfaced to their own individual digital imager RIP 612, 615 and 617. Conceptually similar to the stream embodiment 500 of FIG. 11, the embodiment 600 divides the web imaging bandwidth requirements into separate digital imager stations 312, 315 and 317 with associated separate physical digital imager RIPs 612, 615 and 617 (respectively), thereby dividing the digital imager RIP processor bandwidth requirements by a factor of three.

However, this web imaging bandwidth requirement reduction of embodiment 600 comes at the cost of increased coordination and synchronization complexity arising from ensuring that the different inline press digital imager stations 312, 315 and 317 print the same ticket or document even though the ticket or document is imaged by the inline press digital imager stations 312, 315 and 317 at different times as the web progresses through the press. This is particularly problematic for lottery instant tickets where each imaged document is unique and it is essential for the front variable indicia and back inventory control numbers to be synchronized. While the enhanced queue mark embodiments previously disclosed mitigate the ticket number synchronization problem, depending on the limitations of the cyclic nature of the enhanced queue mark's synchronization numbering system it does not necessarily protect identical ticket numbers imaged at the different inline press digital imager stations 312, 315 and 317 from different packs (i.e., units of instant ticket activation shipped as a common pack or book that have different inventory pack numbers but all use the same set of ticket numbers). Additionally, in some circumstances (e.g., limited gutter space) it may be desirable not to image enhanced queue marks with synchronization information.

Thus, to ensure proper coordination of packs, etc., it is desirable to include a separate RIP dispatcher 601 whenever multiple RIPs are used at different inline press digital imager stations 312, 315 and 317 where printing occurs at different times as the web progresses through the press. The RIP dispatcher 601 communicates with all individual digital imager RIPs 612, 615 and 617 to ensure synchronization of imaging and commonality of error reporting as well as dispensing imaging data at appropriate times. These common communications between the RIP dispatcher 601 and the ancillary individual digital imager RIPs 612, 615 and 617 thereby provide a common thread between the individual RIPs for coordination without placing undue processor burdens on the individual RIPs.

It should be noted that the separate RIP dispatcher 601 is not necessarily needed for instant tickets when different digital imager RIPs are assigned to separate streams on the common web as disclosed in embodiment 500 and 500' in FIGS. 10 and 11 so long as one digital imager RIP is responsible for all printing in its given stream. The single digital imager RIP per stream being capable of coordinating packs and other considerations within its stream and two streams being out of synchronization with each other typically are not problematic, since packs are printed per longitudinal stream and not across or transverse streams. Preferably, if real time decryption of variable indicia is required for security reasons, the decryption can be performed exclusively by the RIP dispatcher 601 (FIG. 13) since it typically has significantly less processing requirements.

The associated system architecture flow diagram 600' of FIG. 14 for the embodiment of system 600 of FIG. 13, illustrates the three individual RIPs (612' "Back", 615' "Front Indicia" and 617' "OP") discretely interfaced to separate digital imager printer head electronics 612", 615" and 617" (respectively) as well as the RIP dispatcher 601'. Thus, each RIP and associated print head and electronics is only responsible for printing its designated inline press digital imager station. In this embodiment, each independent RIP server 612', 615' and 617' would trigger off of common queue marks printed on the web to maintain registration with separate queue mark detectors 602, 603 and 604, since each digital imager station 612", 615" and 617" is located in a different physical location as the web progresses through the press and is consequently triggered at different times. In the event the queue marks include synchronization data (i.e., ticket or document pointer data indicating which ticket or document is to be imaged in a cycle), each RIP server would also decode the cyclical queue mark data 605, 606 and 607 to aid in image synchronization across the digital imagers (i.e., back, front variable indicia, and overprint) in the press line.

Regardless of the queue mark processing method, the raster CPUs for the RIP servers 612', 615' and 617' receive the timing and/or synchronization signals from the queue mark detection and processing logic 605, 606 and 607, optionally accessing each discrete high-level image data from respective memory 611, 612 and 613, and along with other processing, converting the high-level ticket graphic images to raster graphics structure suitable for processing by the associated physical print head electronics 612", 615" and 617'. Once the associated physical print head electronics 612", 615" and 617" receive the raster graphics data, the supplementary print heads print the ticket data at the appropriate station 620, 621 and 623, with the composite physical printed image progressing through the press (i.e., from the "Back" digital imager 620, to the "Front Indicia" digital imager 621, through the fixed plate upper security coating stations 622, finally to the "OP" digital imager 623), with the finished product 624 ready for packaging.

Throughout this process, the RIP dispatcher 601' maintains overall synchronization and timing pulses with the three RIP servers 612', 615' and 617' monitoring each server for any error signals. In a preferred embodiment, as pools of image data are physically printed, the RIP dispatcher provides image data from its master image data file 630, thereby assisting in coordination and reducing bandwidth requirements as well as reducing or eliminating local Ticket Image Data storage (i.e., 611, 612 and 613) of the three RIP servers 612', 615' and 617'. These realized bandwidth and memory reductions are compounded if real time image decryption 630' is required for security purposes.

Thus, the preferred embodiment of utilizing multiple RIPs coordinated via a RIP dispatcher to configure the system such that the image data is streamed to multiple RIPs in different packets or pools. With this preferred embodiment, the digital imager RIP processing bandwidth is divided by only transmitting an individual RIP (e.g., 612', 615' and 617') a limited amount of digital imager data that the RIP server can image without slowing or stopping the press. Consequently, total digital imager RIP processing bandwidth for an entire press run is divided among multiple RIPS with only one RIP controlling imaging at a time. This embodiment has the advantage of simplified synchronization and coordination, since a single RIP drives all digital imagers on the press at any given time.

Accordingly, the embodiment of 600 and 600' of FIGS. 13 and 14 has the advantages of bandwidth reduction by assigning a discrete RIP processor to each physical print head electronics set and the inherent ability to coordinate imaging across the various print streams of the web as well as simplify real time decryption of ciphertext variable indicia. The disadvantages of this embodiment are the added architectural complexity, associated greater costs due to increased hardware and software requirements including the possible need for high bandwidth network connections between the RIP processors in excess of Category 5 Ethernet cable e.g., fiber optic cable.

Figure 15:
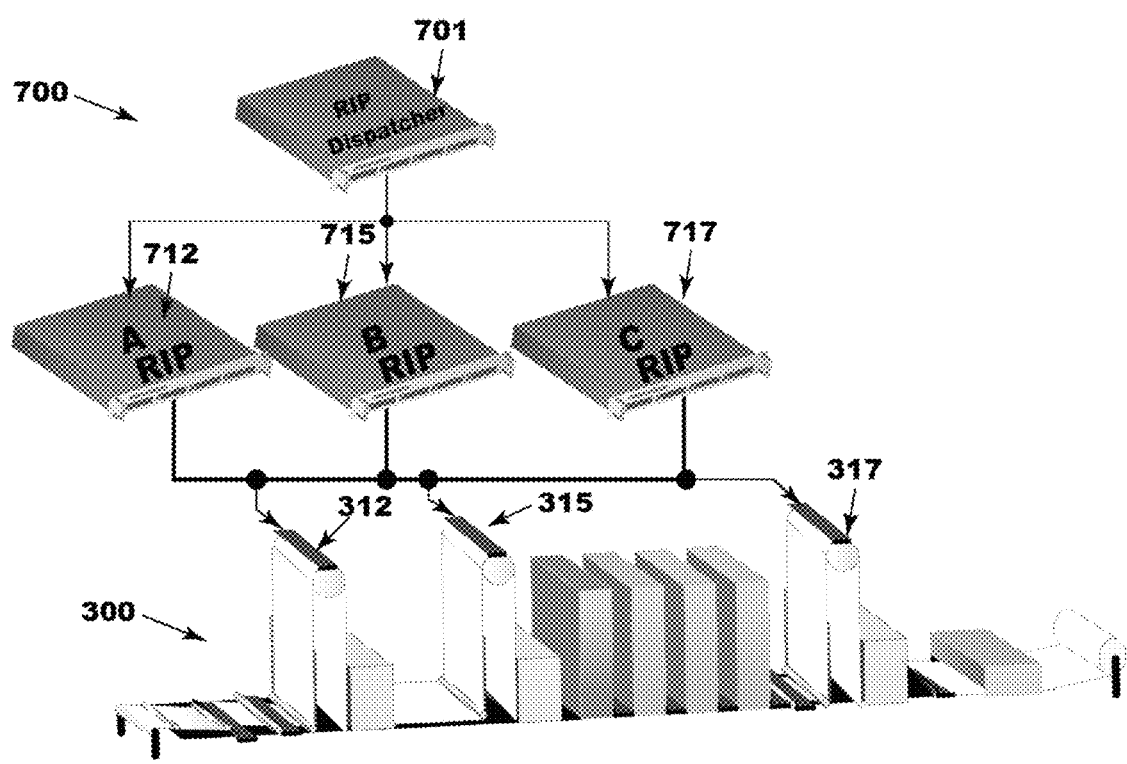
FIG. 15 is a schematic illustration providing a graphical overview of a third exemplary embodiment of dividing the imaging load among multiple RIPs by staggering imaging blocks of data, which is compatible with the embodiments of FIG. 3, FIG. 4, and FIG. 6.
Figure 16:
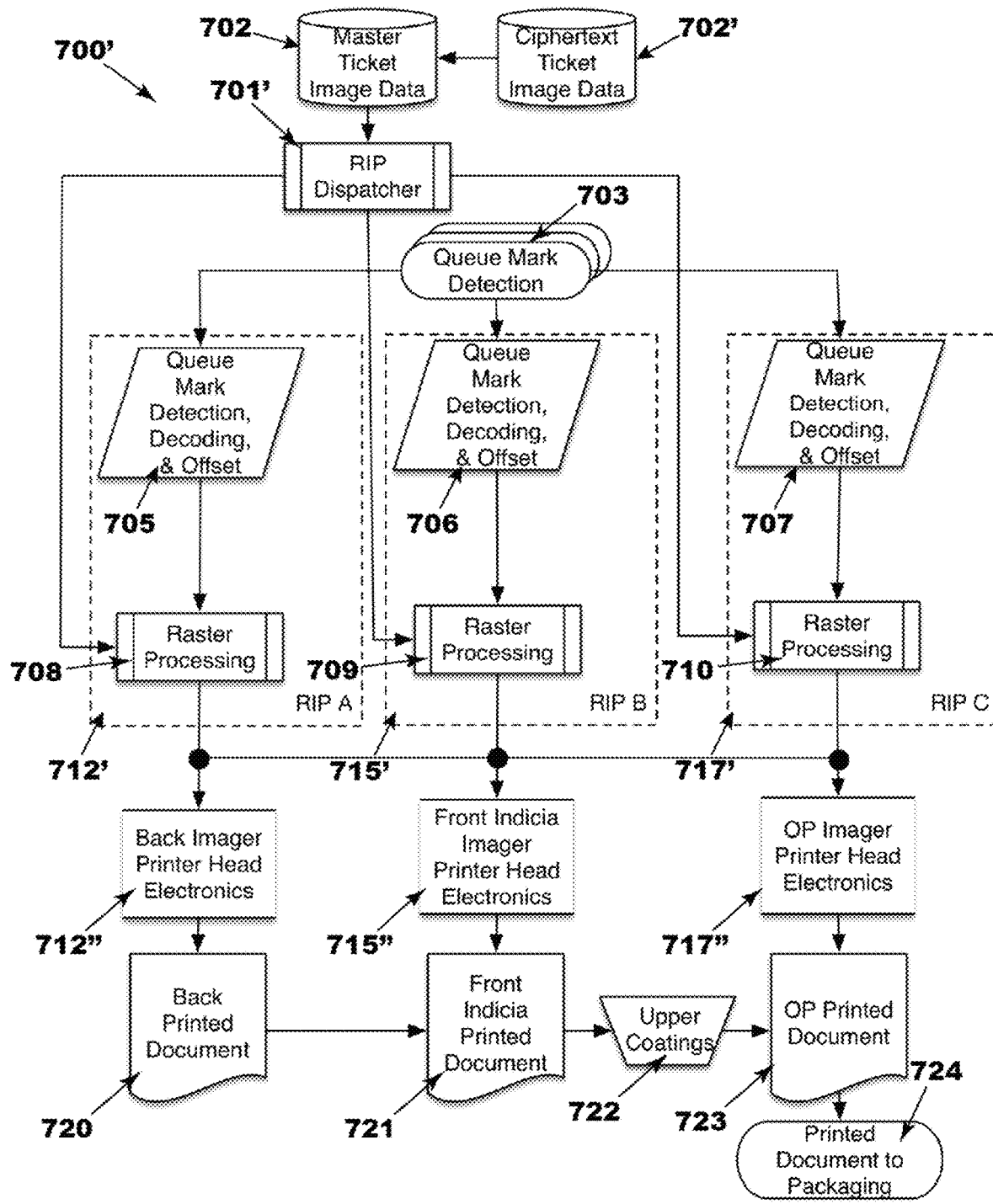
FIG. 16 is a system architecture flow diagram providing a graphical logic flow of the third embodiment of FIG. 15.

FIGS. 15 and 16 taken together illustrate one embodiment of system 700 with its architecture flow diagram 700' for dividing the digital imager RIP processing bandwidth requirements among multiple individual processors on a buffering time division basis. FIG. 15 is a schematic illustration showing an embodiment of system 700 for dividing the imager RIP processing bandwidth requirements among multiple individual processors with each processor bussed output time shared to all print station on the web that is coordinated by a common RIP dispatcher 701. FIG. 16 is the corresponding system architecture flow diagram 700' providing a graphical logic flow of the same embodiment.

FIG. 15 is a schematic illustration showing an embodiment 700 for dividing the digital imager RIP processing bandwidth requirements among multiple individual processors with one RIP Dispatcher processor 701 driving the entire printing line set of digital imagers at any one time. For added clarity, embodiment 700 is shown interfacing its multiple RIPs to all three digital imager stations (the first digital imager 312 "Back", the second digital imager 315 "Front Indicia", and the third digital imager 317 "OP") of the embodiment 300 of FIG. 4. While the embodiment 300 of FIG. 4 is presented interfaced to embodiment 700 in FIG. 15, it should be understood that the same conceptual interface could be readily accomplished with embodiment 200 of FIG. 3 or embodiment 400 of FIG. 6.

As illustrated in FIG. 15, each of the different inline press imager stations 312, 315, and 317 are interfaced via a common bus or multiple discrete serial interfaces to three digital imager RIPs 712, 715 and 717. Similar to the previous embodiment 600 of FIG. 13, embodiment 700 (FIG. 15) divides the web imaging bandwidth requirements by the RIP dispatcher 701 allowing only one digital imager RIP (712, 715 or 717) to control the separate digital imager stations 312, 315 and 317 at any one time. The imaging bandwidth reduction is achieved by dividing the press run imaging data into different blocks or buffers with one block or buffer delivered to a digital imager RIP 712, 715 or 717 at a time. Thus, while one digital imager RIP is driving the printing press, the other two digital imager RIPs are either receiving imaging data from the dispatcher or processing received imaging data, thereby allowing the queued digital imager RIPs to have complete processed raster data in local memory when it becomes its turn to drive the printing press. The individual RIP processor driving the press load is significantly reduced if the image data has already been converted to raster format and is available in memory. This web imaging bandwidth reduction of embodiment 700 has the advantage of only one digital imager RIP controlling the three inline press digital imager stations 312, 315 and 317 at a time with corresponding reduced synchronization complexity as the ticket progresses through the press' three different digital imager stations 312, 315, and 317 at different times.

The system architecture flow diagram 700' of FIG. 16 for the embodiment of system 700 of FIG. 15 illustrates the three individual RIPs (712' "A", 715' "B" and 717' "C") interfaced as a group to separate digital imager printer head electronics 712", 715" and 717", respectively, as well as to the RIP dispatcher 701'. Thus, each RIP can control all three press digital imagers at any one time. In this embodiment, each independent RIP server 712', 715' and 717' would trigger off of common queue marks printed on the web to maintain registration from queue mark detectors 703 local to each imager digital inline press imager station 312, 315 and 317 (FIG. 15). In the event the queue marks include synchronization data (i.e., ticket or document pointer data indicating which ticket or document is to be imaged in a cycle), each RIP server would also decode the cyclical queue mark data (705, 706 and 707—all of FIG. 16) to aid in image synchronization across digital imagers (i.e., back, front variable indicia, and overprint) in the press line.

Regardless of the queue mark processing method, the raster CPUs for the RIP servers 712', 715' and 717' receive the timing and/or synchronization signals from the queue mark detection and processing logic 705, 706 and 707 and transmit the raster graphics structure suitable for processing by the associated physical print head electronics 712", 715" and 717'. Once the associated physical print head electronics 712", 715" and 717" receive the raster graphics data, the accompanying print heads print the ticket data at the appropriate station 720, 721 and 723 with the composite physical printed image progressing through the press (i.e., from the "Back" digital imager 720, to the "Front Indicia" digital imager 721, through the fixed plate upper security coating stations 722, and finally to the "OP" digital imager 723) with the finished product 724 ready for packaging. While one imager RIP is controlling the printing press the other two digital imager RIPs receive high-level image data from the RIP dispatcher 701' memory 702 and optionally encrypted variable indicia 702', and along with other processing, convert the high-level ticket graphic images to the raster graphics structure suitable for processing by the associated physical print head electronics 712", 715" and 717'. Throughout this process, the RIP dispatcher 701' maintains overall synchronization and timing pulses with the three RIP servers 712', 715' and 717', monitoring each server for any error signals.

Hence, the embodiment of system 700 with its architecture flow diagram 700' of FIGS. 15 and 16 has the advantages of bandwidth reduction by assigning networked RIP processors to the entire print line with the inherent ability to coordinate imaging across the various print streams of the web as well as simplify real time decryption of ciphertext variable indicia. The disadvantages of this embodiment are the added architectural complexity and associated greater costs due to increased hardware and software requirements. As would be apparent to one skilled in the art in view of this disclosure, the various disclosed embodiments can be combined to obtain greater imager bandwidth data reduction. For example, the parallel channel embodiment 500 and 500' of FIGS. 11 and 12 can be combined servicing one imager station (e.g., front variable indicia) with one of the dispatcher coordinated embodiments (e.g., 600 and 600' of FIGS. 13 and 14) servicing the entire inline press.

Aside from the synchronization of documents from one inline digital imager to another and accommodating imager RIP processing bandwidth requirements, implementing at least three in-line digital imagers to produce security-enhanced documents with variable indicia using all or some of the standard CMYK process colors poses challenges for color consistency from one in-line digital imager to another. When it is realized, as disclosed in the previous embodiments, that the multiple in-line digital imager applications are applied to the: back, front display and/or variable indicia, and overprint of removable SOC type documents, it can be appreciated that effectively each application is applied to a different base or substrate. For example, in the case of an instant scratch-off ticket back the image is printed directly on the paper substrate or the paper substrate with a primer. However, in the case of the front display and/or variable indicia, the image is printed on top of lower security (e.g., opacity) coatings and contrasting background ink films and optionally primer ink films. In the case of the overprint, the image is printed on top of the release and upper security and SOC ink films optionally with a primer. If the overprint in-line digital imager is used to print both the overprint and the display, the same digital imager is essentially printing on two different background ink films (i.e., both the lower security and the upper security layers).

While it can be reasonably assumed that the ink chemistry of the various background substrates will be designed to produce consistent results from one digital imager application to the next, it cannot be presumed that the resulting image printing will be perfectly consistent, due to the varying requirements of the backgrounds—e.g., the lower security coatings must exhibit high graphic adhesion to provide a foundation to resist being torn by scratching, while at the same time it is essential that the upper security coatings exhibit low graphic adhesion within a given band, such that these ink films can be removed by scratching with an object with just the right amount of pressure. If different ink chemistries or different printing technologies are employed from one in-line digital imager to the other, the problem of imager printing consistent color images worsens.

Figure 17:
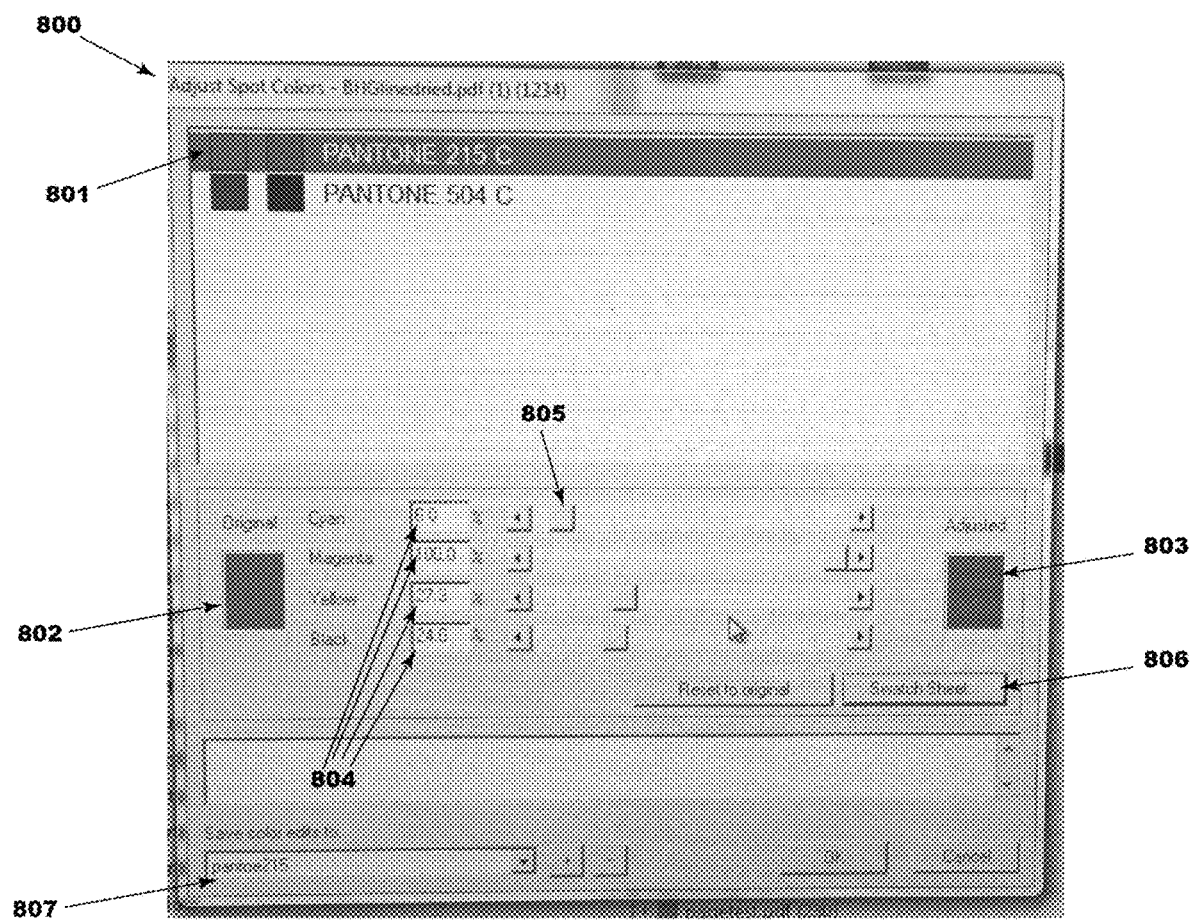
FIG. 17 is a first exemplary illustration of an existing, prior art, color tuning screen display.
Figure 18:
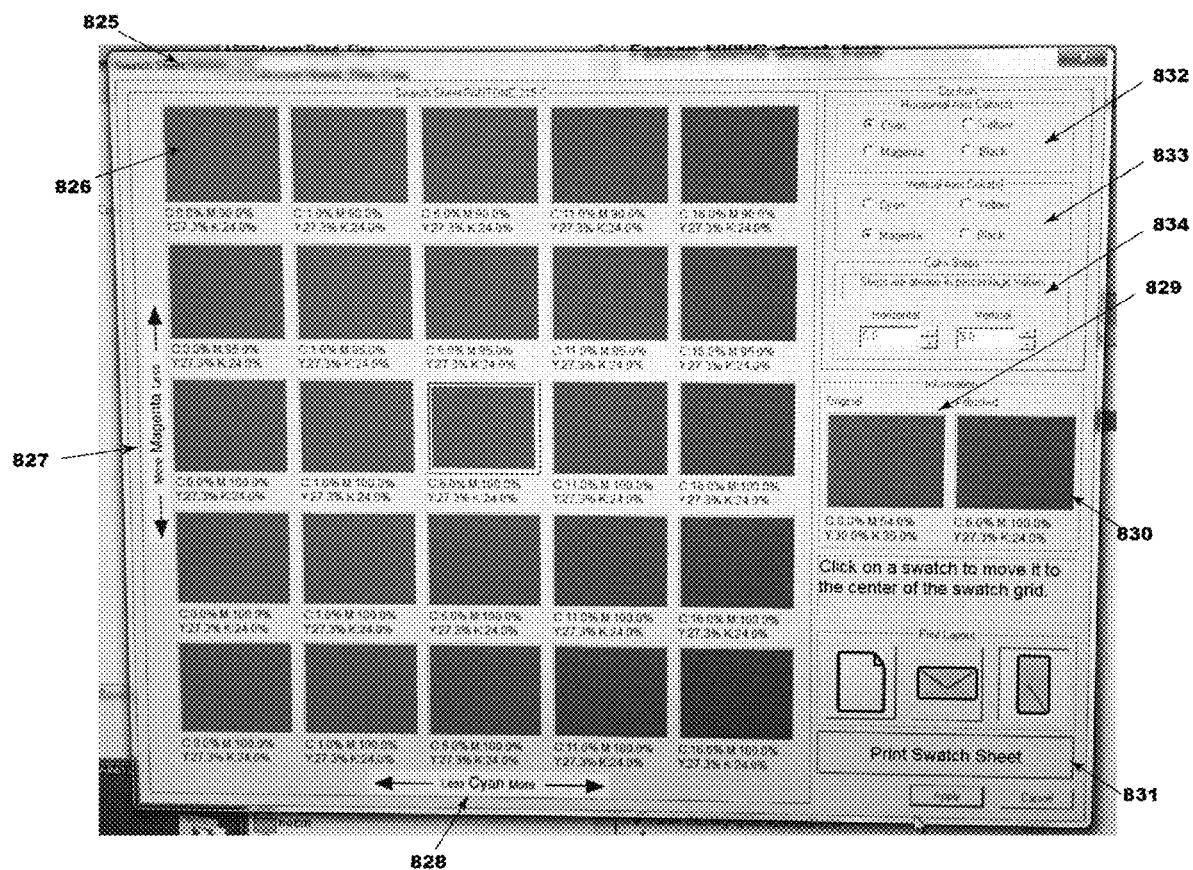
FIG. 18 is a second exemplary illustration of an existing, prior art, color tuning screen display.

Fortunately, various in-line digital imager manufacturers allow for color tuning or adjustment. Innovative Printing Technologies (IPT) Digital of Sarasota, Fla. with their integration of the Memjet® (bubble jet) print head, manufactures one such exemplary system. The IPT Digital system is illustrated as being used in prior art FIGS. 17 and 18. As illustrated in FIGS. 17 and 18, the IPT Digital system allows for press operator level color calibration of its Memjet® print heads to compensate for any difference in color or shade between the desired color and the actual printed product due to substrate variance or other factors. Specifically, as shown in FIG. 17, the IPT system includes an operator control screen 800 for adjusting spot colors. On this operator control screen 800, the operator first selects a color 801 (e.g., "PANTONE® 215 C") that he or she perceives is not printing as intended. When first actuated, the press operator control screen 800 displays the default-programmed-color in both an "Original" window 802 and an "Adjusted" window 803. The preprogrammed default CMYK settings 804 for the selected color 801 are also presented as a starting point. The press operator then clicks on the programming slide bars 805 to change the CMYK settings 804 until the displayed color of the "Adjusted" window 803 resembles what the press operator believes will print correctly. At this point the press operator can print the adjusted color and if the actual printed color is reproduced as desired, the press operator saves the new color profile to memory 807. Alternatively, the press operator can elect to modify the default color with a different "Swatch Sheet" control screen by actuating the associated button 806.

The IPT Digital "Swatch Sheet" control screen 825 (FIG. 18) also allows the press operator to compensate for any difference in color or shade between the desired color and the actual printed product. This "Swatch Sheet" control screen 825 differs from the previous control screen 800 of FIG. 17 in that rather than offering the press operator slider controls 805 to vary the CMYK of the processed color individually, the "Swatch Sheet" control screen 825 presents the press operator with twenty-five different virtual swatches 826 of colors. As illustrated in FIG. 18, these twenty-five different virtual swatches 826 are arranged on the control screen 825 in a two-dimensional grid where the abscissa 828 and ordinate 827 can be programmed with radio buttons 832 and 833 in any one of the CMYK colors progressing in degrees of saturation from the origin (lower left-hand corner) outward. To select a particular virtual swatch 826, the press operator simply clicks on the desired swatch 826, observing the difference between the "Original" window 829 and the "Adjusted" window 830. Again, at this point the press operator can print the adjusted color to determine if the virtual swatch 826 physically prints as desired.

While enabling great flexibility to the press operator, the exemplary system of FIGS. 17 and 18 is only designed to operate on one in-line digital imager station at a time with no regard to calibration of an entire press line with multiple digital imager stations. Additionally, this prior art exemplary system typically operates in an open loop mode where the press operator is forced to guess at the desired color necessary to compensate for any irregularities induced by substrate variance or other causes. Furthermore, while the exemplary system does allow for digitally saving an adjusted color's profile, it is not cognizant of substrate offset or bias, or for that matter, a different technology digital imager also inline. Consequently, any adjusted colors' profiles are not necessarily coordinated by the substrate or digital imager type. Finally, the exemplary prior art system color adjustment capabilities are not cognizant of different areas of a document (e.g., overprint and display) that may have different substrate characteristics, and consequently require different color tuning parameters.

Figure 19:
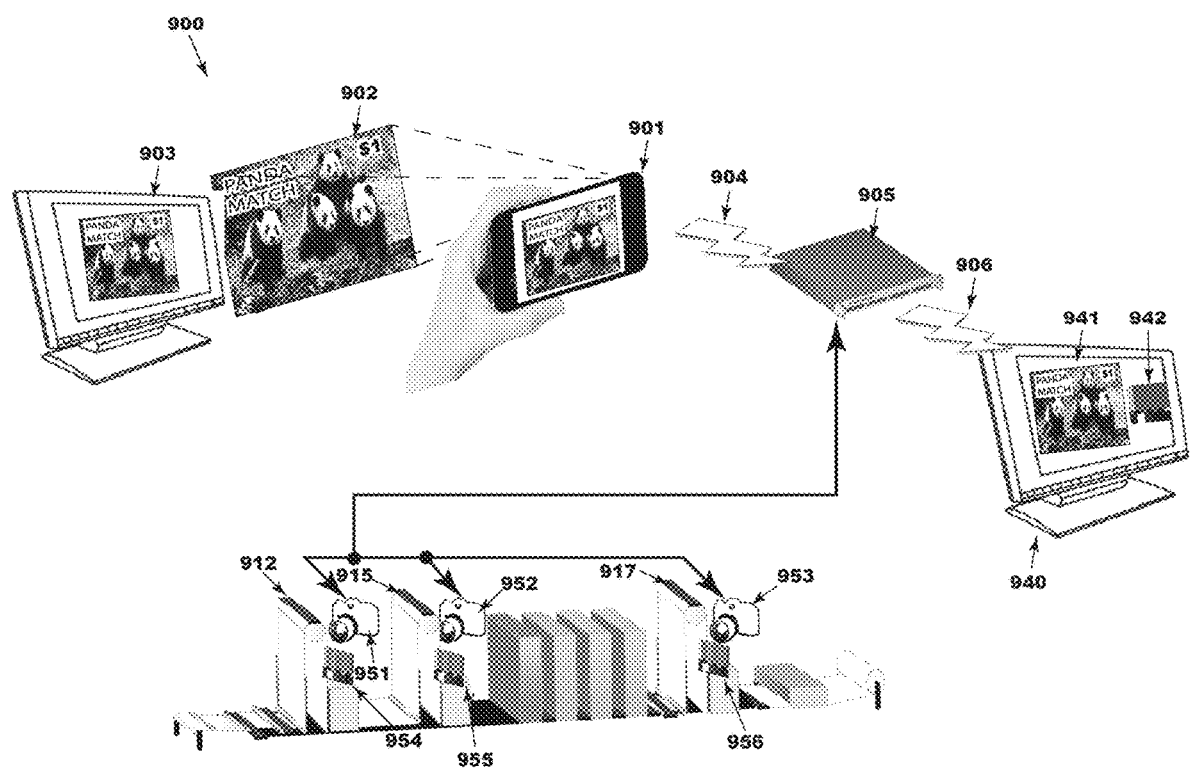
FIG. 19 is a schematic illustration providing a graphical overview of a first exemplary embodiment of tuning colors across multiple imagers, which is compatible with the embodiments of FIG. 3, FIG. 4, and FIG. 6.
Figure 20:
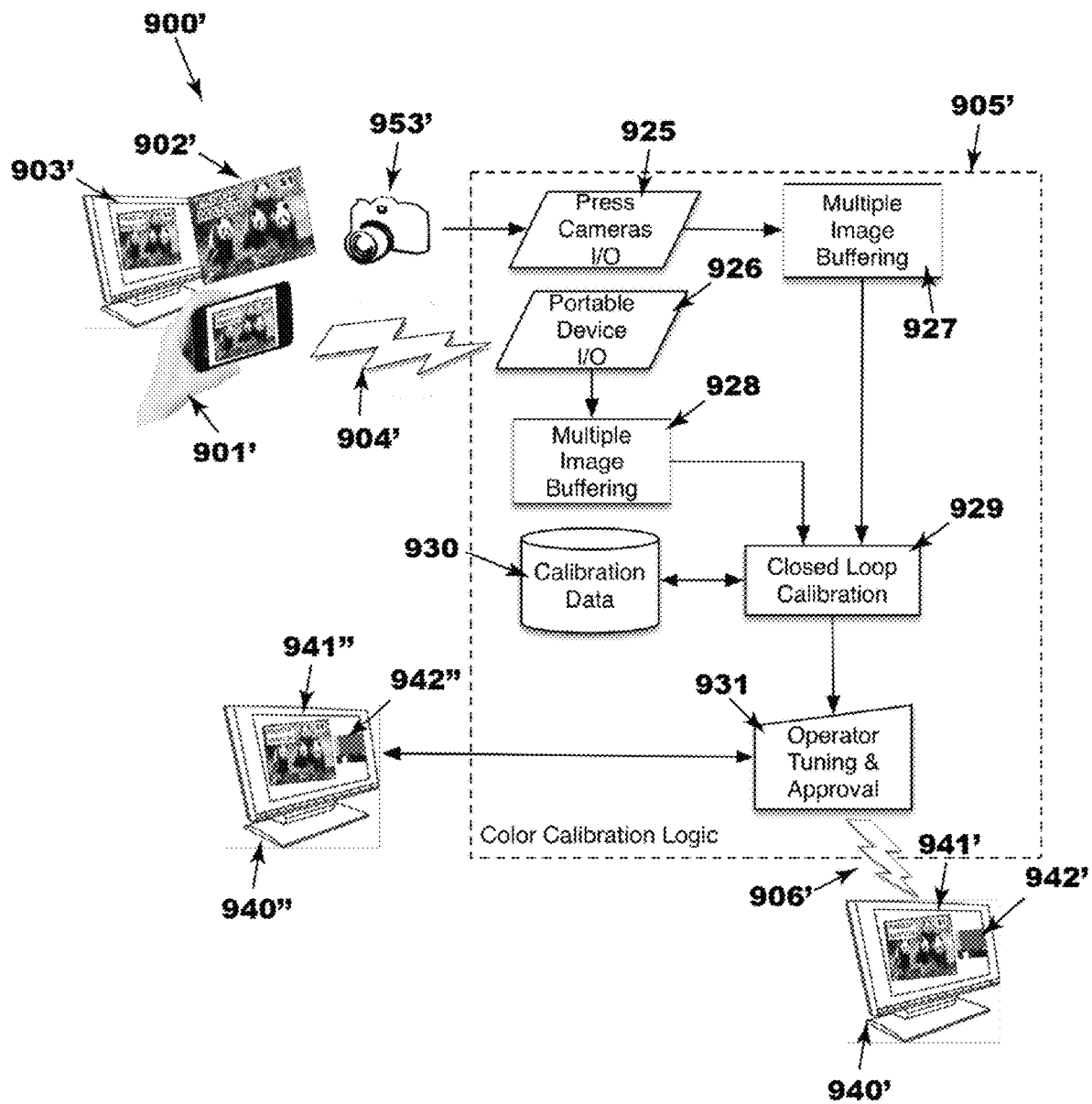
FIG. 20 is an illustration including a system architecture flow diagram providing a graphical logic flow of the embodiment of FIG. 19.

Many of the problems associated with prior art open loop color tuning feedback in which the local press operator is responsible for manually tuning colors as disclosed in FIGS. 17 and 18 can be alleviated with the introduction of a closed loop color tuning feedback in which machine images of the printed product are automatically compared to virtual theoretical printed images. FIGS. 19 and 20, taken together, illustrate embodiment system 900 with its architecture flowchart diagram 900' for providing closed loop feedback of color printing across multiple digital imager stations.

FIG. 19 is a schematic illustration showing an embodiment or an inline press system 900 for providing closed loop feedback to color calibration logic server 905 across multiple imager stations 912, 915 and 917 using either inline press cameras 951, 952 and 953 (respectively) or handheld portable devices 901 with closed loop feedback camera and transmitting capabilities. The color calibration logic server 905 can be either a separate hardware device or, preferably, logic that runs on the appropriate RIP server.

As shown in FIG. 19, closed loop color calibration feedback may be provided with press mounted cameras 951, 952 and 953 strategically positioned after each inline press digital imager 912, 915 and 917 such that each camera 951, 952 and 953 is capable of capturing digital facsimiles of the actual printed images before they are covered or otherwise obfuscated by other parts of the production process. Ideally, these press mounted cameras 951, 952 and 953 should include not only digital facsimiles of the actual printed images but also predetermined color bars (shown in FIG. 19 as elements 954, 955, and 956—i.e., a permanently mounted fixed range of colors and shades that are known to the calibration system) in their field of view. Additionally, the light source illuminating the web should preferably be of a known color temperature (e.g., blackbody radiator temperature of 3,200° Kelvin—"K"), thereby providing a constant for color comparison.

As an alternative or in addition to the press mounted cameras 951, 952 and 953 calibration system, portable handheld closed loop calibration devices 901 with integral cameras may be used by the press operator to capture digital facsimiles of the printed product 902, as well as the virtual theoretical digital image of the printed product on a known operator monitor display 903. As before, the light source illuminating the printed ticket should preferably be of a known color temperature (e.g., blackbody radiator temperature of 3,200° K), thereby providing a constant for color comparison. In this embodiment, the handheld closed loop calibration device(s) 901 would transmit at step 904 their digital facsimiles of the printed document 902 and the theoretical document displayed on the operator monitor display 903 to the color calibration logic server 905, thereby allowing for the device to conduct closed loop calibration.

Regardless of the closed loop digital facsimile acquisition method employed, the color calibration logic server 905 reviews the supplied digital facsimiles, comparing the received digital facsimiles to the desired theoretical colors stored in its memory. Additionally, color calibration logic server 905 also compares the actual printed digital facsimile images with either color bar or monitor scans to compensate for any bias in the cameras. Once the initial color calibration process is completed, a candidate calibrated image 941 is displayed on an operator monitor display 940 for human approval prior to continuing the print run. To allow for possible variances in the monitor 940, ideally a predetermined standard comparison color bar set 942 should also be shown on the same display.

It should be noted that the calibration images could be transmitted as indicated at step 906 to a remote operator monitor display 940 not collocated with the press. A remote monitor thereby allowing a customer to conduct final color approvals without the need to travel to the actual printing site. Alternatively, remote color approval could also be conducted at a customer's office by supplying the customer with a desktop or other remote version of the digital imager and compatible substrate(s). In this alternative embodiment, the calibrated document would be physically printed at the customer's location, thereby allowing the customer to conduct final color approval with an actual printed document. If this alternative remote color calibration process is employed, care should be taken to also print out a predetermined known set of color bars on the same printer to ensure faithful reproduction.

The system architecture flow diagram 900' of FIG. 20 of the same embodiment of system 900, illustrates both types of closed loop calibration cameras (i.e., handheld 901' and inline press mounted 953') as well as local and remote operator monitor displays 940" and 940', respectively, interfaced to the color calibration logic server 905', which preferably can be a part of the physical RIP server for the associated digital imagers or a separate hardware device. As before, closed loop color calibration feedback of the physical printed document 902' may be provided either with a press mounted camera 953' or a portable handheld closed loop calibration device 901' transmitting at step 904' the captured digital facsimile of the printed document 902' to the color calibration logic server 905'.

The color calibration logic server 905' receives the digital facsimile with its associated Input/Output (I/O) logic at steps 925 and 926, passing the facsimile digital data to buffer memory 927 and 928. Also transmitted to and stored in the buffer memory 927 and 928 are either color bar (not shown in FIG. 20) or operator monitor display 903' calibration scans to allow for compensation of any bias in the cameras 953' and 901'. These document digital facsimile and calibration scan data are then accessed by the closed loop calibration logic 929 comparing the actual printed document 902' facsimile digital data to the theoretic digital image archived in memory 930. Differences between the actual printed document 902' facsimile digital data and theoretical are determined by the closed loop calibration logic 929, with offset biases calculated for each of the four process colors (i.e., CMYK) typically increasing or decreasing each color by some variable percentage of saturation. Also included in the closed loop calibration logic 929 processing is any known historical data stored in memory 930 (e.g., previous offsets for known substrates) that may be added to the bias calculation.

When the closed loop calibration logic 929 completes its bias calculations for each CMYK channel, a visual representation of the proposed offset bias ticket 941' and 941" is generated at 931 and displayed on local 940" or remote 940' operator monitor displays along with the raw (i.e., unadjusted) actual ticket digital facsimile image, and preferably, color calibration bars (942' and 942"). At this point, the local or remote operator will either approve the calibration bias or modify the suggested bias 931 before continuing the press run. When the final offset is determined it is recorded in the historical calibration data memory 930 along with any other salient facts (e.g., substrate type, imager type) for recall for future print runs.

Figure 21:
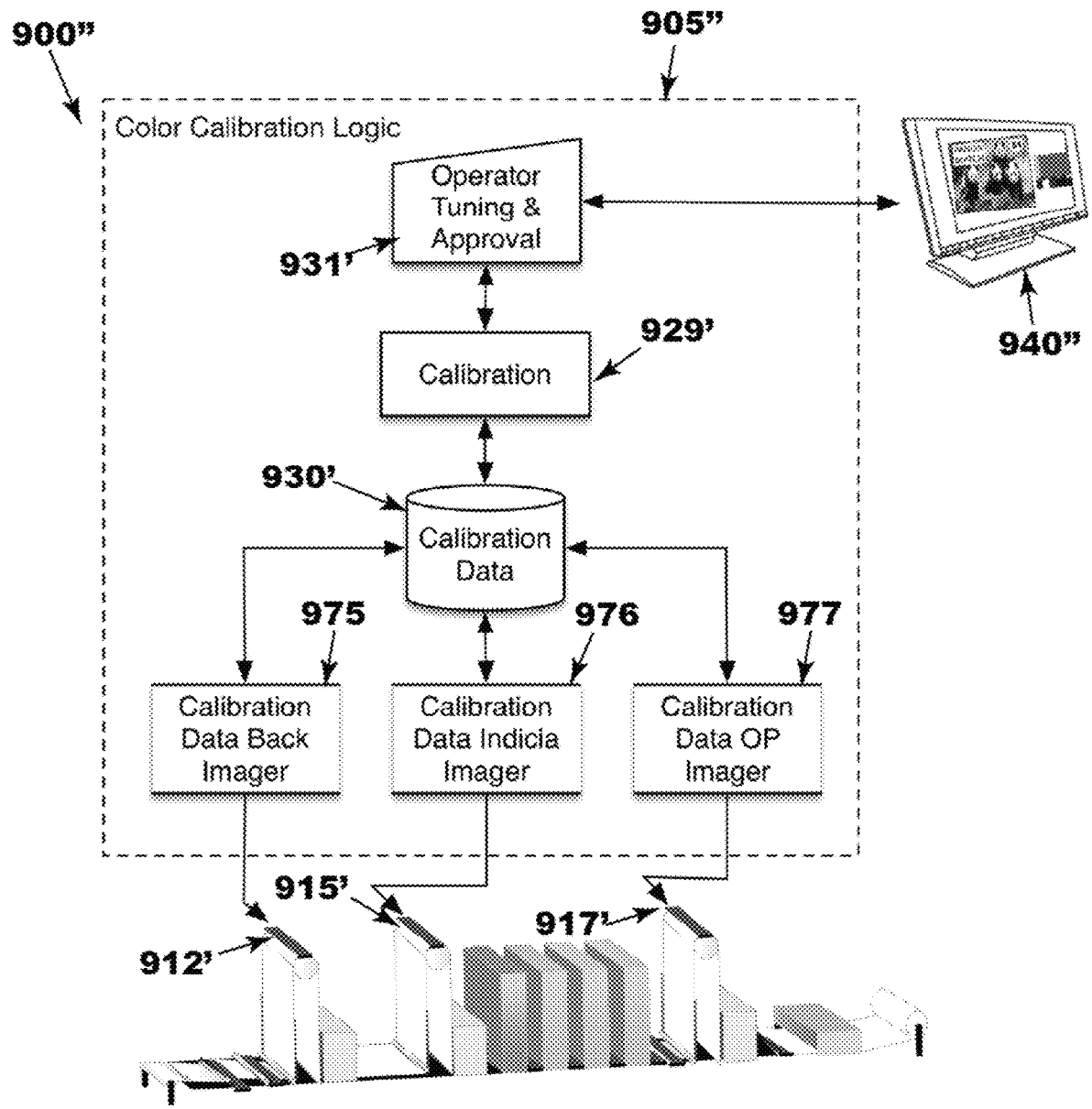
FIG. 21 is a schematic diagram providing a graphical overview of a second exemplary embodiment of tuning colors across multiple imagers, which is compatible with the embodiments of FIG. 3, FIG. 4, and FIG. 6.

In addition to or instead of closed loop feedback as described with respect to the system 900 and its architecture flow diagram 900', individual CMYK channel offsets can be developed in an additional embodiment of system 900" (FIG. 21) for each digital imager in the press line 912', 915' and 917' and archived in the historical calibration data memory 930'. Since in many circumstances each digital imager in the line is printing on a different base or substrate (e.g., instant ticket back image printed directly on paper substrate and/or paper substrate with a primer, front variable indicia printed on top of lower security coatings and contrasting background ink films and optionally primer ink films, overprint image printed on top of upper security and SOC ink films with optionally a primer), the offset calibration bias required for each imager may vary to maintain consistent color. Thus, this additional embodiment maintains bias setting memory for each inline digital imager electronics 975, 976 and 977 that is nevertheless saved under the general category of the overall press run, thereby maintaining an overall memory 930' of the various offset biases needed for printing consistent colors for a given document. Similar to before, once the candidate offset biases are determined for each inline digital imager, a virtual composite image (i.e., an image capable of illustrating all imager layers) is generated and displayed at 931' and 940", thereby allowing an operator to approve or adjust the offsets prior to production 931'.

Figure 22:
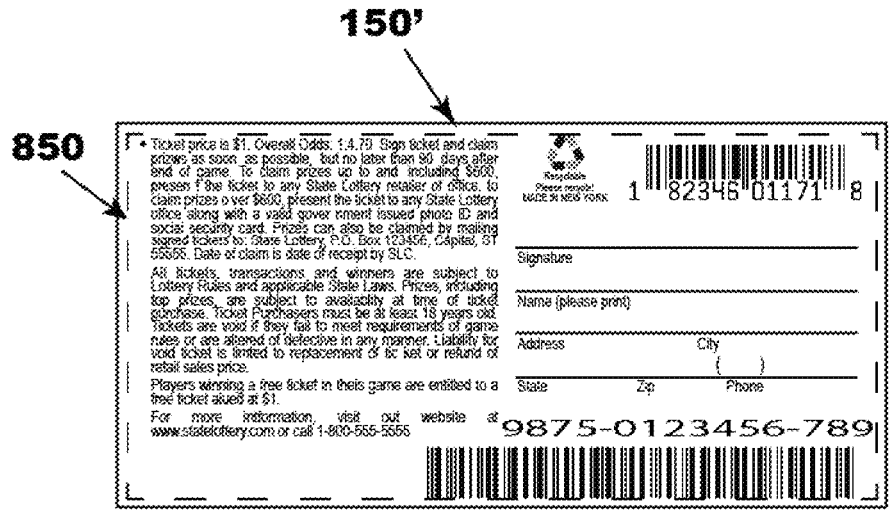
FIG. 22 is a plan view of a representative example of a lottery-type instant ticket back, front indicia, and display and overprint printing coordination zones, which is compatible with the embodiment of FIG. 21.
Figure 22:
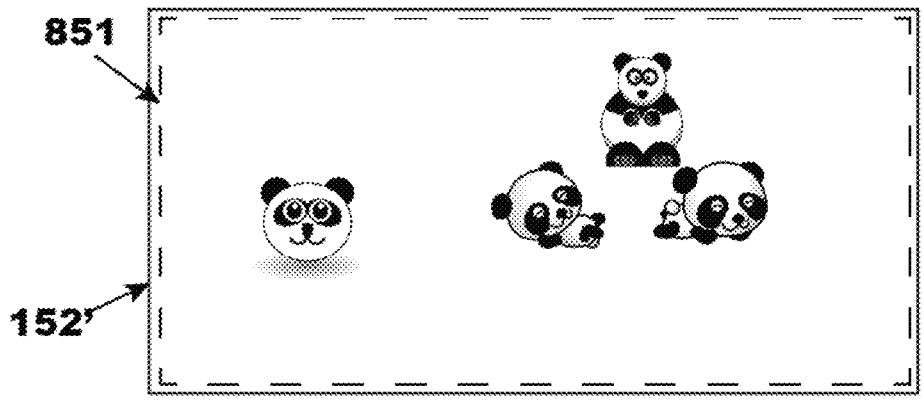
Figure 22:
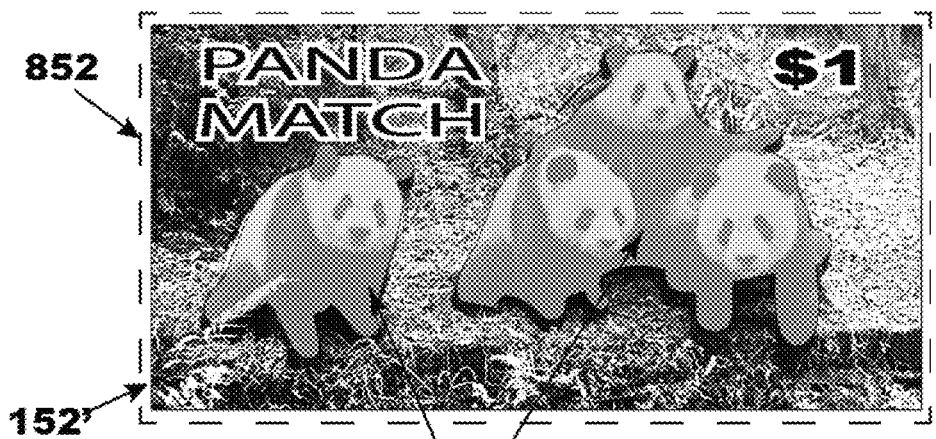

In addition to offset calibration bias required for each digital imager, there may also be a need for providing separate offset calibration biases for different areas of a document printed by the same digital imager. For example, FIG. 22 illustrates the three general offset areas for each digital imager required to produce the prior art exemplary traditional lottery-type instant ticket of FIG. 2. However, as shown in FIG. 22, offset calibration bias area 850 is added as part of this embodiment defining one general offset area for the entire back of the ticket 150' with a different offset calibration bias area 851 for the ticket's front 152' variable indicia and a general third offset calibration bias area 852 for the Over Print (OP) and display digital imager also printing on the ticket's front 152'. However, this third OP digital imager also includes a second zoned offset calibration bias for the ticket's scratch-off OP area 853 that is different than its display. This is because the ink film substrate of the OP scratch-off area is typically very dissimilar chemically than the ink film substrate for the display, and consequently, typically requires different color biasing than the display—e.g., higher levels of CMYK saturation to compensate for less primer in the OP area. The difference in ink film chemistry is attributable to the need of the OP area to scratch-off with correspondingly limited graphic adhesion and also strict human toxicity requirements, due to the chances of trace amounts of scratch-off residue being ingested and hence, typically no direct energy curable ink formulations that may be permissible in the general display (i.e., non-scratch-off) area. Thus, by allowing for zoned offsets on the same digital imager, changes in color imaging due to different ink film substrates on the same surface can be accounted for and corrected.

It should also be noted that the calibration bias from one inline digital imager to another may be proportionate (but, not necessarily equivalent) to another digital imager offset bias. This is principally due to a common ink printing chemistry imaged on varying ink film substrate surfaces. Thus, some surfaces with thicker primer (e.g., ticket back 150' of FIG. 22) may require less saturation than a different ink film substrate with lesser primer (e.g., ticket OP 853). Once the offset calibration bias for a given base (e.g., ticket back 150') is known, it is theoretically possible to calculate anticipated offset biases for the other imagers with different ink film substrates. These offset biases may be in the form of constants for each CMYK channel that are either multiplied by, or added to, or subtracted from the base calibration bias, thereby greatly reducing time and labor for a new press setup. As before, the calculated offset biases can first be displayed to an operator to allow for acceptance or further tuning before proceeding with the press run. An additional feedback loop can also be established with any operator tuning of the calculated offset bias being saved and used in future offset calculations.

Of course, there are other variations of the disclosed embodiments that would be apparent to anyone skilled in the art in view of this disclosure.

What is claimed is:

1. A method for producing Scratch-Off Coating (SOC) protected tickets or documents on an inline web press using a calibration system that includes (i) multiple digital imagers each maintaining registration with the other, (ii) a closed loop feedback camera system including a physical embodiment of a display of a fixed range of colors and shades that are known to the calibration system and which is physically separate from the tickets or documents, and (iii) an operator monitor display, the method for producing the SOC protected tickets or documents having an overall press run that includes an initial press run and a subsequently occurring continued press run, the method comprising:

(a) printing on a substrate in the initial press run, with each digital imager of the inline web press, process color physical images comprised of varying amounts of Cyan, Magenta, Yellow, and blacK (CMYK) ink or dye, thereby producing one or more SOC protected tickets or documents;

(b) capturing color digital facsimiles with the closed loop feedback camera system, the color digital facsimiles having (i) CMYK data of at least a portion of the printed process color physical images of the one or more SOC protected tickets or documents, and (ii) the physical embodiment of the display of the fixed range of colors and shades that are known to the calibration system and which is physically separate from the tickets or documents;

(c) comparing the color digital facsimiles or the fixed range of colors and shades with initially established color calibration data;

(d) digitally adjusting, using the results of the comparison, the varying amounts of CMYK data of the color digital facsimile images to calibrate the printed tickets and documents to substantially match the initially established color calibration data;

(e) displaying the digitally adjusted color digital facsimile images on the operator monitor display, thereby enabling human operator approval of the digitally adjusted color digital images;

(f) saving the digital adjustments of the varying amounts of CMYK data of the color digital facsimile images for approved digitally adjusted color digital images to a memory storage associated with the inline web press for use in the subsequently occurring continued press run so that the subsequently produced SOC protected tickets or documents substantially match the initially established color calibration data; and (g) performing the subsequently occurring continued press run for producing additional SOC protected tickets or documents using the saved digital adjustments, wherein the SOC protected tickets or documents in the initial press run have the same printed components as the SOC protected tickets or documents in the subsequently occurring continued press run, and wherein the initial press run and the subsequently occurring continued press run are performed on the same inline web press.

2. The method of claim 1, further comprising:
(h) displaying the initially established color calibration data on the same operator monitor display as the digitally adjusted digital facsimile images of the tickets and documents or the fixed range of colors and shades.

3. The method of claim 1, wherein the operator monitor display used for human operator approval is physically located in a different geographical location than the inline web press producing the process color physical images.

4. The method of claim 1, wherein the closed loop feedback camera system includes at least one portable handheld device.

5. The method of claim 1, further comprising:
(h) defining multiple offset calibration bias areas on portions of the printed tickets and documents wherein each calibration bias area includes its own color calibration data.

6. The method of claim 1, wherein the tickets or documents are pull-tab tickets or game pieces.

7. The method of claim 1, wherein the physical embodiment of the display of fixed range of colors and shades that are known to the calibration system are predetermined color bars.

8. The method of claim 7, wherein step (c) further comprises displaying a predetermined standard comparison color bar set in addition to the digitally adjusted color digital facsimile images on the operator monitor display, thereby enabling human operator approval of the digitally adjusted color digital images.

9. The method of claim 1, wherein the physical embodiment of the display of fixed range of colors and shades that are known to the calibration system are illuminated with a known color temperature source.

10. The method of claim 9, wherein the known color temperature light source has a blackbody radiator temperature of 3,200° Kelvin.

* * * * *